United States Patent
Neuman

(10) Patent No.: US 11,531,148 B2
(45) Date of Patent: Dec. 20, 2022

(54) OPTICAL COATINGS FOR GLASS AND GLASS LAMINATES

(71) Applicant: GENTEX CORPORATION, Zeeland, MI (US)

(72) Inventor: George A. Neuman, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 227 days.

(21) Appl. No.: 17/061,605

(22) Filed: Oct. 2, 2020

(65) Prior Publication Data

US 2021/0103078 A1 Apr. 8, 2021

Related U.S. Application Data

(60) Provisional application No. 62/909,384, filed on Oct. 2, 2019.

(51) Int. Cl.
  *G02B 5/20* (2006.01)
  *B60J 1/00* (2006.01)
  *B60J 3/00* (2006.01)

(52) U.S. Cl.
  CPC ............. *G02B 5/20* (2013.01); *B60J 1/001* (2013.01); *B60J 3/007* (2013.01)

(58) Field of Classification Search
  CPC . G02B 5/208; G02B 5/20; G02B 5/281; B60J 1/001; B60J 3/007; C03C 2217/734; C03C 2217/94; C03C 2217/948; C03C 17/36; C03C 17/3613; C03C 17/3639; C03C 17/3647; C03C 17/3649; C03C 17/366; C03C 17/3681; C03C 27/10; B32B 17/10036; B32B 17/10174; B32B 17/10229; B32B 17/10761; B32B 17/10788

USPC .......................................... 359/601, 602, 603
See application file for complete search history.

(56) References Cited

U.S. PATENT DOCUMENTS

| | | | |
|---|---|---|---|
| 2011/0236663 A1* | 9/2011 | Fleury | C03C 17/3676 428/428 |
| 2014/0233093 A1* | 8/2014 | Thielsch | G02B 5/0808 359/359 |
| 2015/0004383 A1* | 1/2015 | Sandre-Chardonnal | C03C 17/3657 428/213 |
| 2016/0370586 A1* | 12/2016 | Saenger Nayver | G02F 1/13439 |

FOREIGN PATENT DOCUMENTS

DE 102011116191 A1 4/2013

OTHER PUBLICATIONS

International Search Report dated Jan. 21, 2021, for correspondence PCT Application No. PCT/US2020/053885, 2 pages.
(Continued)

*Primary Examiner* — Jade R Chwasz
(74) *Attorney, Agent, or Firm* — Price Heneveld LLP; Brian James Brewer

(57) ABSTRACT

An optical coating for a glass substrate includes an inner metal or metal alloy layer, a first pair of transparent conductive oxide or dielectric layers, and a pair of outer metal or metal alloy layers. The optical coating includes an eye-weighted transmittance of less than about 20% and an eye-weighted reflectance of less than about 30%, as measured with a D65 illuminant according to the CIE 10° Standard Observer.

19 Claims, 9 Drawing Sheets

(56) References Cited

OTHER PUBLICATIONS

Written Opinion dated Jan. 21, 2021, for correspondence PCT application No. PCT/US2020/053885, 3 pages.

* cited by examiner

OPTICAL COATINGS FOR GLASS AND GLASS LAMINATES

CROSS-REFERENCE TO RELATED APPLICATION

This application claims priority under U.S.C. § 119(e) to U.S. Provisional Application No. 62/909,384 filed on Oct. 2, 2019, entitled "OPTICAL COATINGS FOR GLASS AND GLASS LAMINATES," the disclosure of which is hereby incorporated by reference in its entirety.

FIELD OF THE DISCLOSURE

The present disclosure generally relates to optical coatings for glass and glass laminates and, more specifically, to optical coatings for windows and sunroofs.

BACKGROUND

Sunroofs may provide a vehicle with a pleasing aesthetic and may provide an appearance of a more spacious interior, which is desirable to some consumers. However, vehicle sunroofs may present various challenges. As the size of the sunroof increases, the solar load on the vehicle may also increase. The increase in solar load may result in an increased interior temperature, which may increase demand on the vehicle air conditioning and ventilation systems. In addition, solar light in the visible region of the electromagnetic spectrum may cause undesirable glare, which may decrease the desirability of the sunroof.

Conventional means for addressing the challenges related to controlling the solar load in vehicle sunroofs may introduce other challenges. For example, one method of addressing sunroof solar load includes reducing transmittance of light in the visible region with absorbing materials incorporated into the glass and/or laminated with the sunroof. However, the absorbing materials may result in light transmitted through the sunroof having a visible color, which may undesirably alter the appearance of portions of the vehicle interior. Low transmittance of visible light may also lead to a contrast ratio issue with respect to light entering the vehicle interior from the exterior. Interior lighting may reflect off the absorbing materials in the glass/laminating materials, which may introduce reflections and/or glare that are undesirable.

Near infrared reflecting materials may also be used to address the challenges related to controlling solar load in vehicle sunroofs. However, when water beads up on the exterior of the sunroof, the water may optically couple with the near infrared reflecting materials, causing an undesirable iridescent effect. The addition of near infrared absorbers may help to inhibit the iridescent effect, however, the absorbers may also increase the haze of the glass material of the sunroof.

SUMMARY

According to an aspect of the present disclosure, an optical coating for a glass substrate includes an inner metal or metal alloy layer, a first pair of transparent conductive oxide or dielectric layers, and a pair of outer metal or metal alloy layers. The inner metal or metal alloy layer includes a refractive index of about 4 or less, as measured at a wavelength of 550 nm, the inner metal or metal alloy layer including a first surface and a second surface. One of the first pair of transparent conductive oxide or dielectric layers is disposed over the first surface and the other of the first pair of transparent conductive oxide or dielectric layers is disposed over the second surface. Each of the first pair of transparent conductive oxide or dielectric layers individually comprises a refractive index of about 3.0 or less, as measured at a wavelength of 550 nm. One of the pair of outer metal or metal alloy layers is disposed over each of the first pair of transparent conductive oxide or dielectric layers, and each of the pair of outer metal or metal alloy layers individually includes a refractive index of at least about 2, as measured at a wavelength of 550 nm. The optical coating includes an eye-weighted transmittance of less than about 20% and an eye-weighted reflectance of less than about 30%, as measured with a D65 illuminant according to the CIE 10° Standard Observer.

According to an aspect of the present disclosure, an optical coating for a glass substrate includes an inner metal or metal alloy layer, a first pair of transparent conductive oxide or dielectric layers, and a pair of outer metal or metal alloy layers. The inner metal or metal alloy layer includes a refractive index of about 4 or less, as measured at a wavelength of 550 nm, the inner metal or metal alloy layer including a first surface and a second surface. One of the first pair of transparent conductive oxide or dielectric layers is disposed over the first surface and the other of the first pair of transparent conductive oxide or dielectric layers is disposed over the second surface. Each of the first pair of transparent conductive oxide or dielectric layers individually comprises a refractive index of about 2.5 or less, as measured at a wavelength of 550 nm. One of the pair of outer metal or metal alloy layers is disposed over each of the first pair of transparent conductive oxide or dielectric layers, and each of the pair of outer metal or metal alloy layers individually includes a refractive index of at least about 2, as measured at a wavelength of 550 nm. The optical coating includes an absolute transmittance of less than or equal to about 30% and an absolute reflectance of less than or equal to about 40% at each wavelength of light in the range of 400 nm to 800 nm, as measured at an angle of incidence AOI of 0 degrees.

These and other aspects, objects, and features of the present disclosure will be understood and appreciated by those skilled in the art upon studying the following specification, claims, and appended drawings.

DETAILED DESCRIPTION

Figure 1A:
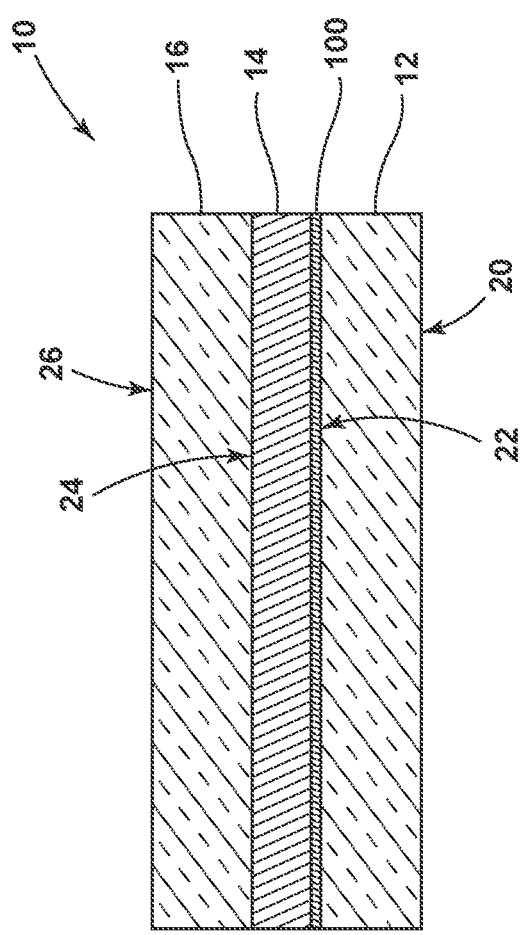
FIG. 1A is a cross-sectional view of a schematic of a glass laminate article having an optical coating, according to an aspect of the present disclosure.

The specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Aspects of the present disclosure relate to an optical coating for use with a substrate that is characterized by an eye-weighted transmittance of less than about 20% and an eye-weighted reflectance of less than about 30%, as measured with a D65 illuminant according to the CIE 10° Standard Observer. The substrate may be substantially transparent. For example, the substrate may be constructed of glass, plastic, ceramic, or flexible webs, such as PET foil. In other words, the substrate may be any suitable substantially transparent material. Additionally, the substrate may be constructed of a monolithic material or a laminate material. The term "eye-weighted reflectance" and the symbol "Yr" is used to refer to reflectance values that are reported as the Y value in the CIE Yxy color system, which is weighted to the human eye's sensitivity to light intensity. The term "eye-weighted transmittance" and the symbol "Yt" is used to refer to transmittance values that are reported as the Y value in the CIE Yxy color system, which is weighted to the human eye's sensitivity to light intensity. The term "raw" or "unweighted" as used with respect to reflectance or transmittance refers to reflectance and transmittance values, respectively, which are not eye-weighted.

While the optical coating of the present disclosure is discussed in the context of a vehicle sunroof, it is understood that the present aspects may be utilized in architectural sunroofs, architectural windows, vehicle windows, aircraft sunroofs, aircraft windows, and any other relevant application. The optical coating of the present disclosure may be utilized with a single, monolithic glass substrate or a glass laminate. The optical coating may be used alone or in combination with other coatings, layers, and substrates, based on the end use application of the optical coating. The optical coating may be disposed between two or more substrates or may be disposed on an exterior surface of a substrate.

Referring to FIGS. 1A-3, an optical coating 100 for a glass substrate according to aspects of the present disclosure is illustrated. The optical coating 100 includes an inner metal or metal alloy layer 102 having a refractive index of about 4 or less, as measured at a wavelength of 550 nm. The inner metal or metal alloy layer 102 includes a layer first surface 104 and a layer second surface 106. A first pair of first and second transparent conductive oxide or dielectric layers 108a, 108b is disposed over the layer first and second surfaces 104, 106 of the inner metal or metal alloy layer 102, respectively. Each of the first pair of transparent conductive oxide or dielectric layers 108a, 108b individually includes a refractive index of about 3.0 or less, as measured at a wavelength of 550 nm. A pair of first and second outer metal layers 110a, 110b is disposed over of the first and second transparent conductive oxide or dielectric layers 108a, 108b, respectively. Each of the pair of outer metal layers 110a, 110b individually includes a refractive index of at least about 2, as measured at a wavelength of 550 nm. The optical coating 100 is characterized by an eye-weighted transmittance of less than about 20% and an eye-weighted reflectance of less than about 30%, as measured with a D65 illuminant according to the CIE 10° Standard Observer.

Figure 1B:
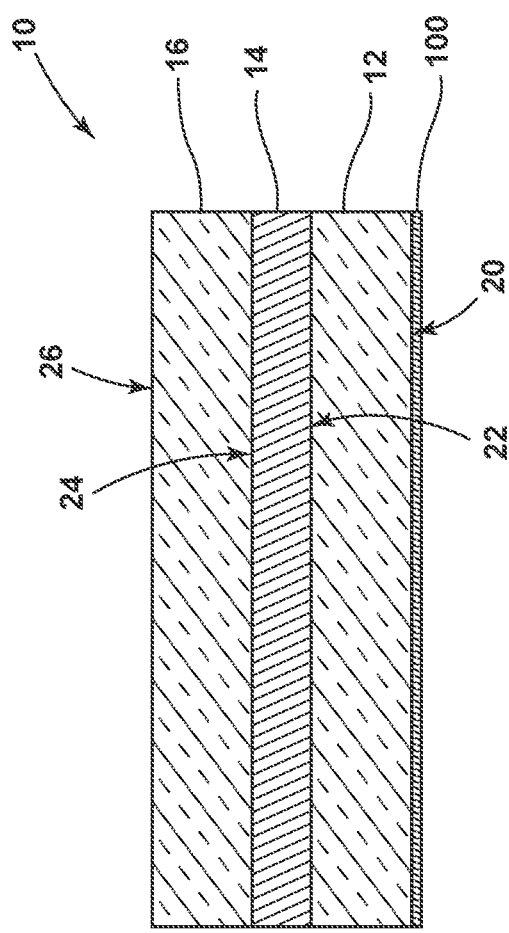
FIG. 1B is a cross-sectional view of a schematic of a glass laminate article having an optical coating, according to an aspect of the present disclosure.
Figure 2:
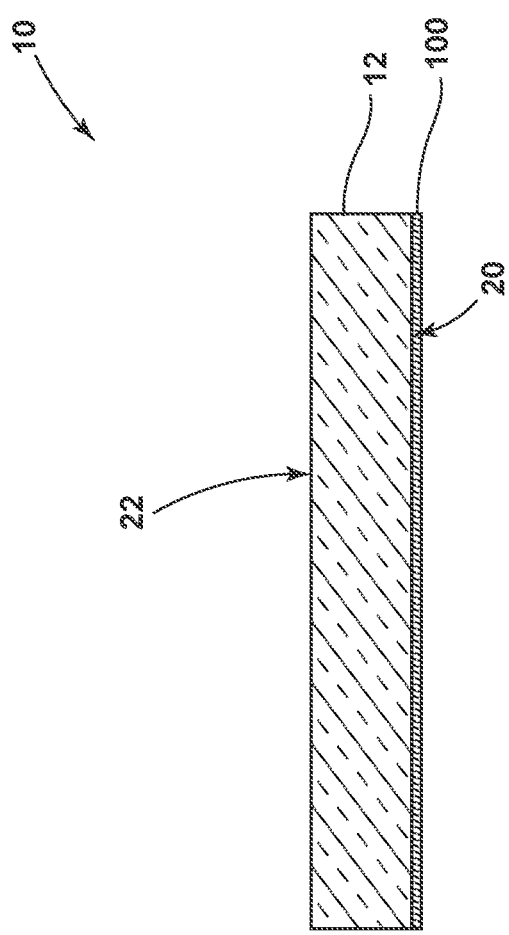
FIG. 2 is a cross-sectional view of a schematic of a monolithic glass article having an optical coating, according to an aspect of the present disclosure.

With reference now to FIGS. 1A-2, a substantially transparent article 10, is illustrated as either a substrate laminate, as illustrated in FIGS. 1A-1B, or a monolithic substrate, as illustrated in FIG. 2. The substantially transparent article 10 may include a first substrate 12, a polymeric layer 14, and a second substrate 16 (FIGS. 1A-1B). The first and second substrates 12, 16 may be substantially transparent. Further, the substantially transparent article 10 may form, at least part of, a vehicle sunroof structure and may optionally include one or more additional glass substrate layers or other layers, non-limiting examples of which include adhesive layers, tie layers, protectant layers, scratch-resistant layers, water proofing layers, fingerprint-resistant layers, etc. In the context of a sunroof, the first substrate 12 may be disposed adjacent to an interior of a vehicle (not shown), between the second substrate 16 and the vehicle interior, and thus may be referred to as the first or first substrate 12. When present, the second substrate 16, illustrated in FIGS. 1A-1B, may be disposed adjacent to an exterior of the vehicle, between the first substrate 12 and the exterior of the vehicle, and thus may be referred to as the second or exterior glass substrate 16. The first substrate 12 may include a first surface 20 facing the vehicle interior and a second surface 22 facing the exterior glass substrate 16. The exterior glass substrate 16 may include a third surface 24 facing the vehicle interior and a fourth surface 26 facing the exterior of the vehicle. When only first substrate 12 is present, as illustrated in FIG. 2, the first surface 20 may be referred to as the interior surface and the second surface 22 may be referred to as the exterior surface. Additional coatings and/or layers may be provided on any one of the first, second, third, and fourth surfaces 20, 22, 24, and/or 26 based on the intended use of the substantially transparent article 10.

An optical coating 100 may be disposed over one or more of the first, second, third, and/or fourth surfaces 20, 22, 24, 26. As illustrated in FIG. 1A, the optical coating 100 is disposed over the second surface 22 of the first substrate 12. FIG. 1B illustrates another exemplary embodiment in which the optical coating 100 is disposed over the first surface 20 of the first substrate 12. In another example, the optical coating 100 may be disposed over the third surface 24 of the second substrate 16 (not shown). In yet another example, the optical coating 100 may be disposed over the fourth surface 26 of the second substrate 16 (not shown). In another example, a first optical coating 100 may be disposed over one of the first, second, third, and/or fourth surfaces 20, 22, 24, 26 of the first and second substrates 12, 16, and one or more additional optical coatings 100 may be disposed over any one or more of the other of the first, second, third, and/or fourth surfaces 20, 22, 24, 26. When more than one optical coating 100 is used, each optical coating 100 may have the same or different components.

Still referring to FIGS. 1A-1B, the first and second substrates 12, 16 may be the same material or a different material. For example, the first and second substrate 12, 16 may be constructed of glass, plastic, ceramic, or flexible webs, such as PET foil. In other words, the substrate may be any suitable substantially transparent material. The glass material may be any glass material for use in vehicle sunroofs, architectural sunroofs, architectural windows, vehicle windows, aircraft sunroofs, aircraft windows, etc. Additionally, the glass material may be tempered, non-tempered, annealed, or non-annealed. As illustrated in FIGS. 1A-1B, the first and second substrates 12, 16 are part of a laminate structure that includes a polymeric layer 14 that includes a laminating material, such as polyvinyl butyral (PVB), ethylene vinyl acetate (EVA), or other laminating material, joining the first and second substrates 12, 16.

While aspects of the present disclosure are discussed in the context of a substantially transparent article 10 having a laminate construction of FIGS. 1A-1B, the optical coating 100 of the present disclosure may be used with a single substrate, as illustrated in FIG. 2, such as a monolithic glass that includes a single sheet of glass formed using a float glass manufacturing process, a tempered, non-tempered, annealed, or non-annealed glass material. In other aspects, the optical coating 100 may be used with a laminate that includes more than two substrates.

Figure 3:
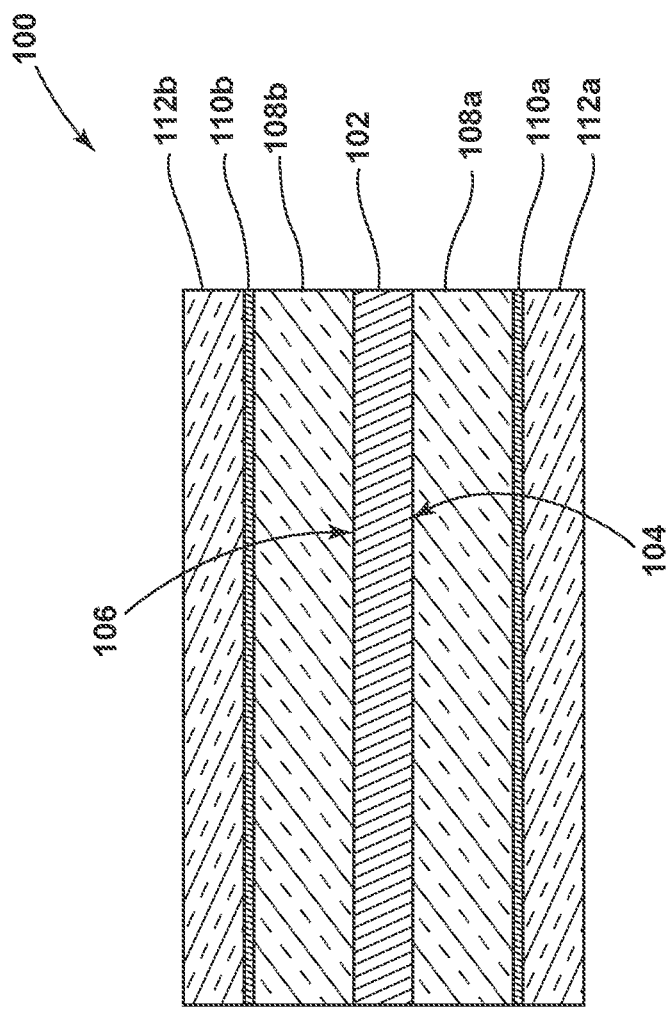
FIG. 3 is a cross-sectional view of a schematic of an optical coating, according to an aspect of the present disclosure.

Referring now to FIG. 3, the optical coating 100 includes an inner metal or metal alloy layer 102, a first pair of first and second transparent conductive oxide (TCO) or dielectric layers 108a, 108b, and a pair of first and second outer metal or metal alloy layers 110a, 110b. The optical coating 100 may optionally include one or more additional TCO or dielectric layers, such as third and/or fourth TCO or dielectric layers 112a, 112b. The inner metal or metal alloy layer 102 may include a layer first surface 104 and an opposing layer second surface 106. The first TCO or dielectric layer 108a may be disposed over the layer first surface 104 and the second TCO or dielectric layer 108b may be disposed over the layer second surface 106. The first outer metal or metal alloy layer 110a may be disposed over the first TCO or dielectric layer 108a and the second outer metal or metal alloy layer 110b may be disposed over the second TCO or dielectric layer 108b. The optional third TCO or dielectric layer 112a, when present, may be disposed over the first outer metal or metal alloy layer 110a. The optional fourth TCO or dielectric layer 112b, when present, may be disposed over the second outer metal or metal alloy layer 110b. It is understood that this basic structure may be added to in the form of additional layers to help adhesion, environmental durability or additional optical tuning while being within the scope of this invention. Additionally, the layers herein are described in terms of fixed materials. It is understood that the layers may be further divided into sub-layers of the same or different composition while still being within the scope of this invention.

In some aspects, the inner metal or metal alloy layer 102 may be characterized by a refractive index of about 4 or less, about 3 or less, about 2 or less, or about 1 or less, as measured at a wavelength of 550 nm. For example, the inner metal or metal alloy 102 may have a refractive index of from about 0.1 to about 5, about 0.1 to about 4, about 0.1 to about 3, about 0.1 to about 2, about 0.1 to about 1, about 0.5 to about 5, about 0.5 to about 4, about 0.5 to about 3, about 0.5 to about 2, about 0.5 to about 1, about 1 to about 5, about 1 to about 4, about 1 to about 3, about 1 to about 2, about 2 to about 5, about 2 to about 4, about 2 to about 3, about 3 to about 5, or about 4 to about 5, as measured at a wavelength of 550 nm. For example, the inner metal or metal alloy layer 102 may have a refractive index of about 0.1, 0.14, 0.15, 0.5, 1, 1.3, 1.5, 2, 2.5, 3, 3.1, 3.5, 4, 4.5, 5, or any refractive index value between these values, as measured at a wavelength of 550 nm.

In some aspects, the inner metal or metal alloy layer 102 may be characterized by an extinction coefficient of at least about 3, as measured at a wavelength of 550 nm. For example, the inner metal or metal alloy layer 102 may have an extinction coefficient of at least about 3, at least about 4, at least about 5, or at least about 6, as measured at a wavelength of 550 nm. In one example, the inner metal or metal alloy layer 102 may have an extinction coefficient of from about 3 to about 6, about 3 to about 5, about 3 to about 4, about 4 to about 6, or about 5 to about 6, as measured at a wavelength of 550 nm. For example, the inner metal or metal alloy layer 102 may have an extinction coefficient of about 3, about 3.5, about 3.6, about 3.7, about 3.8, about 3.9, about 4, about 4.3, about 4.4, about 4.5, about 4.6, about 4.7, about 4.8, about 4.9, about 5, about 5.5, about 6, or any extinction coefficient between these values, as measured at a wavelength of 550 nm.

In some aspects, the inner metal or metal alloy layer 102 may be characterized by a physical thickness of from about 2.5 nm to about 100 nm. In some examples, the inner metal or metal alloy layer 102 may have a physical thickness of from about 2.5 nm to about 100 nm, about 2.5 nm to about 75 nm, about 2.5 nm to about 50 nm, about 2.5 nm to about 25 nm, about 25 nm to about 100 nm, about 25 nm to about 75 nm, or about 25 nm to about 50 nm. For example, the inner metal or metal alloy layer 102 may have a physical thickness of about 2.5 nm, about 5.0 nm, about 10 nm, about 15 nm, about 17 nm, about 20 nm, about 30 nm, about 35 nm, about 40 nm, about 50 nm, about 60 nm, about 70 nm, about 80 nm, about 90 nm, about 100 nm, or any physical thickness between these values. The exact physical thickness of the inner metal or metal alloy layer 102 may be, based at least in part, on characteristics of the other layers of the optical coating 100, characteristics of the materials of the inner metal or metal alloy layer 102, such as the refractive index and extinction coefficient, and/or the location of the optical coating 100 with respect to the glass substrate and other components of the article.

In some aspects, the inner metal or metal alloy layer 102 may be characterized by an optical thickness of from about 0.005 to about 0.125. As used herein, optical thickness refers to the product of the physical thickness of a given layer and its real refractive index. The Optical thickness may be equal to the real index multiplied by the layer thickness divided by 550 nm. In some aspects, the inner metal or metal alloy layer 102 may have an optical thickness of from about 0.005 to about 0.125, about 0.007 to about 0.125, about 0.009 to about 0.125, about 0.01 to about 0.125, about 0.05 to about 0.125, about 0.09 to about 0.125, about 0.1 to about 0.125, about 0.005 to about 0.1, about 0.007 to about 0.1, about 0.009 to about 0.1, about 0.01 to about 0.1, about 0.05 to about 0.1, about 0.09 to about 0.1, about 0.005 to about 0.09, about 0.007 to about 0.09, about 0.009 to about 0.09, about 0.01 to about 0.09, or about 0.05 to about 0.09.

The inner metal or metal layer 102 may be characterized as a semi-transparent metal or metal alloy, wherein the term semi-transparent refers to a transmittance of at least 50% for each wavelength of light in the range of 380 nm to 760 nm for the thickness as required in a given multi-layer stack for a given application. In some examples, the inner metal or metal layer 102 may have a transmittance of at least 50%, at least 40%, at least 30%, 25%, at least 20%, at least 15%, at least 10%, or at least 5% for each wavelength of light in the range of 380 nm to 760 nm. For example, the inner metal or metal layer 102 may have a transmittance of from about 2% to about 25%, about 2% to about 20%, about 2% to about 15%, about 2% to about 10%, about 2% to about 5%, about 5% to about 25%, about 5% to about 20%, about 5% to about 15%, about 5% to about 10%, about 10% to about 25%, about 10% to about 20%, about 10% to about 15%, about 15% to about 25%, about 15% to about 20%, or about 7% to about 11% for each wavelength of light in the range of 380 nm to 760 nm.

The inner metal or metal alloy layer 102 may include at least one of a silver alloy, a silver-gold alloy, chrome, ruthenium, stainless steel, silicon, titanium, nickel, molybdenum, indium, palladium, osmium, aluminum, cobalt, cadmium, niobium, brass, bronze, tungsten, rhenium, iridium, scandium, yttrium, zirconium, vanadium, manganese, iron, zinc, tin, lead, bismuth, antimony, rhodium, tantalum, copper, nickel, gold, platinum, a chromium alloy, a ruthenium alloy, a silicon alloy, a titanium alloy, a nickel alloy, a molybdenum alloy, nickel-based alloys, an indium alloy, a palladium alloy, an osmium alloy, an aluminum alloy, a cobalt alloy, a cadmium alloy, a niobium alloy, brass, bronze, a tungsten alloy, a rhenium alloy, an iridium alloy, a scandium alloy, a yttrium alloy, a zirconium alloy, a vanadium alloy, a manganese, an iron alloy, a zinc alloy, a tin alloy, a lead alloy, a bismuth alloy, an antimony alloy, a rhodium alloy, a tantalum alloy, a copper alloy, a gold alloy, a platinum alloy, an aluminum-silicon alloy, Inconel, and combinations thereof. In one example, the inner metal or metal alloy layer 102 may be an aluminum-silicon alloy having an aluminum to silicon ratio of 60:40. In another example, the inner metal or metal alloy layer 102 may be an aluminum-silicon alloy having an aluminum to silicon ratio of 85:15. In yet another example, the silicon to aluminum ratio may vary between 60 to 95% aluminum. In yet another embodiment the aluminum silicon alloy may contain additional elements to improve durability, optical properties, or the like. In yet another example, the inner metal or metal alloy layer 102 may be a silver-gold alloy having a gold content of 7% by weight (wt %). In yet another example, the gold content may vary between about 3 and 50%.

In some aspects of the present disclosure, the first pair of first and second TCO or dielectric layers 108a, 108b may include the same or different material and may have the same or different physical and/or optical thicknesses. Each of the first and second TCO or dielectric layers 108a, 108b, may individually have a refractive index of about 3.0 or less, as measured at a wavelength of 550 nm. In some aspects, each of the first and second TCO or dielectric layers 108a, 108b, may individually have a refractive index of about 3.0 or less, about 2.5 or less, about 2.2 or less, about 2 or less, about 1.8 or less, about 1.5 or less, about 1.25 or less, or about 1 or less, as measured at a wavelength of 550 nm. For example, each of the first and second TCO or dielectric layers 108a, 108b, may individually have a refractive index of from 1.25 to about 3.0, about 1.25 to about 2.5, about 1.25 to about 2.2, about 1.25 to about 2, about 1.25 to about 1.8, about 1.25 to about 1.5, about 1.5 to about 2.5, about 1.5 to about 2.2, about 1.5 to about 2, about 1.5 to about 1.8, or about 2 to about 2.5, as measured at a wavelength of 550 nm. For example, each of the first and second TCO or dielectric layers 108a, 108b, may individually have a refractive index of about 1.25, about 1.8, about 2, about 2.1, about 2.2, about 2.3, about 2.4, about 2.5, about 3.0 or any refractive index value between these values, as measured at a wavelength of 550 nm. The first and second TCO or dielectric layers 108a, 108b may have the same or different refractive index.

In some aspects, each of the first and second TCO or dielectric layers 108a, 108b, may individually have an extinction coefficient of less than about 0.2, as measured at a wavelength of 550 nm. In some aspects, each of the first and second TCO or dielectric layers 108a, 108b, may individually have an extinction coefficient of less than about 0.2, or less than about 0.01, as measured at a wavelength of 550 nm. For example, each of the first and second TCO or dielectric layers 108a, 108b, may individually have an extinction coefficient of from about 0 to about 0.2, about 0 to about 0.01, about 0.0005 to about 0.2, about 0.0005 to about 0.01, about 0.01 to about 1, about 0.01 to about 0.8, about 0.01 to about 0.6, about 0.01 to about 0.4, about 0.01 to about 0.2, as measured at a wavelength of 550 nm. The first and second TCO or dielectric layers 108a, 108b may have the same or different extinction coefficient.

In some aspects, each of the first and second TCO or dielectric layers 108a, 108b may individually have a physical thickness of from about 10 nm to about 100 nm. For example, each of the first and second TCO or dielectric layers 108a, 108b, may individually have a physical thickness of from about 10 nm to about 100 nm, about 10 nm to about 75 nm, about 10 nm to about 50 nm, about 10 nm to about 25 nm, about 25 nm to about 100 nm, about 25 nm to about 75 nm, about 25 nm to about 50 nm, about 50 nm to about 75 nm, or about 50 nm to about 100 nm. The exact physical thickness of each of the first and second TCO or dielectric layers 108a, 108b may be based at least in part on characteristics of the other layers of the optical coating 100, characteristics of the materials of each of the first and second TCO or dielectric layers 108a, 108b, such as the refractive index and extinction coefficient, and/or the location of the optical coating 100 with respect to the glass substrate and optionally other components of the article. The first and second TCO or dielectric layers 108a, 108b may have the same or different physical thickness.

In some aspects, each of the first and second TCO or dielectric layers 108a, 108b may individually have an optical thickness of from about 0.01 to about 0.5. For example, each of the first and second TCO or dielectric layers 108a, 108b may individually have an optical thickness of from about 0.01 to about 0.5, about 0.01 to about 0.4, about 0.01 to about 0.3, about 0.1 to about 0.5, about 0.1 to about 0.4, about 0.1 to about 0.3, about 0.15 to about 0.5, about 0.15 to about 0.4, about 0.15 to about 0.3, about 0.2 to about 0.5, about 0.2 to about 0.4, or about 0.2 to about 0.3. For example, each of the first and second TCO or dielectric layers 108a, 108b may individually have an optical thickness of about 0.01, about 0.04, about 0.1, about 0.12, about 0.13, about 0.14, about 0.15, about 0.16, about 0.17, about 0.18, about 0.19, about 0.2, about 0.21, about 0.22, about 0.23, about 0.24, about 0.25, about 0.26, about 0.27, about 0.28, about 0.29, about 0.3, about 0.4, about 0.5, or any optical thickness between these values. The first and second TCO or dielectric layers 108a, 108b may have the same or different optical thickness.

Each of the first and second TCO or dielectric layers 108a, 108b may include at least one of $SiO_2$, MgO, $Nb_2O_3$, $Ta_2O_5$, $ZrO_2$, $MgF_2$, $TiO_x$, $CeO_x$, $SnO_2$, ZnS, $NiO_x$, $Cr_xO_y$, $Nb_xO_y$, and $ZrO_x$, $WO_3$, NiO or $Ti_xSiO_y$, zinc oxide, aluminum zinc oxide, titanium oxide, silicon nitride, indium doped tin oxide, iron doped tin oxide, antimony doped tin oxide, doped zinc oxide, aluminum doped zinc oxide, gallium doped zinc oxide, boron doped zinc oxide, indium doped zinc oxide, and combinations thereof. In one example, one or both of the first and second TCO or dielectric layers 108a, 108b includes indium doped tin oxide (ITO). In another example, one or both of the first and second TCO or dielectric layers 108a, 108b includes niobium trioxide ($Nb_2O_3$). The first and second TCO or dielectric layers 108a, 108b may have the same or different materials.

The optional one or more additional TCO or dielectric layers, such as the third and fourth TCO or dielectric layers 112a, 112b, may have any of the characteristics, properties, and thicknesses described above with respect to the first and second TCO or dielectric layers 108a, 108b. In some examples, the additional TCO or dielectric layers in a given optical coating 100 may have the same characteristics, properties, and/or thicknesses of the first and second TCO or dielectric layers 108a, 108b of the given optical coating 100. In some examples, the additional TCO or dielectric layers in a given optical coating 100 may have different characteristics, properties, and/or thicknesses from that of the first and second TCO or dielectric layers 108a, 108b of the given optical coating 100. For example, in one exemplary optical coating 100, the first, second, third, and fourth TCO or dielectric layers 108a, 108b, 112a, 112b may include ITO, optionally having the same or different refractive index, extinction coefficient, physical thickness, and/or optical thickness. In another example, an exemplary optical coating 100 may include a first and second TCO or dielectric layer 108a, 108b including ITO and a third and fourth TCO or dielectric layer 112a, 112b including $Nb_2O_3$.

For example, in some aspects, the first and second TCO or dielectric layers 108a, 108b, may individually have a physical thickness of from about 10 nm to about 100 nm to satisfy a desired reflectance, transmittance, and/or color characteristic, while the optional, additional TCO or dielectric layers may have a broader range of physical thickness. In some examples, a physical thickness of the optional, additional TCO or dielectric layers may be from about 10 nm to about 100 nm, from about 10 nm to about 200 nm, from about 10 nm to about 300 nm, from about 10 nm to about 400 nm, or from 10 nm to about 500 nm or more. In some aspects, the physical and optical thickness of the first and second TCO or dielectric layers 108a, 108b and any optional, additional TCO or dielectric layers may be individually selected to provide the desired reflectance, transmittance, and/or color characteristics of the optical coating 100.

In some aspects, each of the first and second outer metal or metal alloy layers 110a, 110b may individually be characterized by a refractive index of at least about 2, as measured at a wavelength of 550 nm. In some aspects, each of the first and second outer metal or metal alloy layers 110a, 110b may individually have a refractive index of at least about 2, at least about 3, or at least about 4, as measured at a wavelength of 550 nm. For example, each of the first and second outer metal or metal alloy layers 110a, 110b may individually have a refractive index of from about 2 to about 5, about 2 to about 4, about 2 to about 3, about 3 to about 5, about 3 to about 4, or about 4 to about 5, as measured at a wavelength of 550 nm. For example, each of the first and second outer metal or metal alloy layers 110a, 110b may individually have a refractive index of about 2, about 2.5, about 2.6, about 2.7, about 2.8, about 2.9, about 3, about 3.1, about 3.2, about 3.3, about 3.4, about 3.5, about 3.6, about 3.7, about 3.8, about 3.9, about 4, about 4.1, about 4.2, about 4.3, about 4.4, about 4.5, about 4.6, about 4.7, about 4.8, about 4.9, about 5, or any refractive index between these values, as measured at a wavelength of 550 nm. The first and second outer metal or metal alloy layers 110a, 110b may have the same or different refractive index.

In some aspects, each of the first and second outer metal or metal alloy layers 110a, 110b may individually be characterized by an extinction coefficient of at least about 3, as measured at a wavelength of 550 nm. For example, each of the first and second outer metal or metal alloy layers 110a, 110b may individually have an extinction coefficient of at least about 3, at least about 4, or at least about 5, as measured at a wavelength of 550 nm. In one example, each of the first and second outer metal or metal alloy layers 110a, 110b may individually have an extinction coefficient of from about 3 to about 6, about 3 to about 5, about 3 to about 4, about 4 to about 6, or about 5 to about 6, as measured at a wavelength of 550 nm. For example, each of the first and second outer metal or metal alloy layers 110a, 110b may individually have an extinction coefficient of about 3, about 3.5, about 3.6, about 3.7, about 3.8, about 3.9, about 4, about 4.1, about 4.2, about 4.3, about 4.4, about 4.5, about 4.6, about 4.7, about 4.8, about 4.9, about 5, about 5.1, about 5.2, about 5.3, about 5.4, about 5.5, about 5.6, about 5.7, about 5.8, about 5.9, about 6, or any extinction coefficient between these values, as measured at a wavelength of 550 nm. The first and second outer metal or metal alloy layers 110a, 110b may have the same or different extinction coefficient.

In some aspects, each of the first and second outer metal or metal alloy layers 110a, 110b may individually have a physical thickness of from about 1 nm to about 20 nm. In some aspects, each of the first and second outer metal or metal alloy layers 110a, 110b may individually have a physical thickness of from about 1 nm to about 20 nm, about 2 nm to about 20 nm, about 3 nm to about 20 nm, about 4 nm to about 20 nm, about 5 nm to about 20 nm, about 1 nm to about 15 nm, about 2 nm to about 15 nm, about 3 nm to about 15 nm, about 4 nm to about 15 nm, about 5 nm to about 15 nm, about 1 nm to about 10 nm, about 2 nm to about 10 nm, about 3 nm to about 10 nm, about 4 nm to about 10 nm, about 5 nm to about 10 nm, about 1 nm to about 5 nm, about 2 nm to about 5 nm, about 3 nm to about 5 nm, or about 4 nm to about 5 nm. For example, each of the first and second outer metal or metal alloy layers 110a, 110b may individually have a physical thickness of about 1 nm, about 1.5 nm, about 2 nm, about 2.5 nm, about 2.9 nm, about 3 nm, about 3.1 nm, about 3.2 nm, about 4 nm, about 4.1 nm, about 4.2 nm, about 4.3 nm, about 4.5 nm, about 4.6 nm, about 4.7 nm, about 4.8 nm, about 4.9 nm, about 5 nm, about 5.1 nm, about 5.2 nm, about 5.3 nm, about 5.4 nm, about 5.5 nm, about 5.6 nm, about 5.7 nm, about 5.8 nm, about 5.9 nm, about 6 nm, about 6.1 nm, about 7 nm, about 9 nm, about 10 nm, about 11 nm, about 12 nm, about 13 nm, about 14 nm, about 15 nm, about 16 nm, about 17 nm, about 18 nm, about 19 nm, about 20 nm, or any physical thickness between these values. The first and second outer metal or metal alloy layers 110a, 110b may have the same or different physical thickness.

In some aspects, each of the first and second outer metal or metal alloy layers 110a, 110b may individually have an optical thickness of from about 0.001 to about 0.1. In some aspects, each of the first and second outer metal or metal alloy layers 110a, 110b may individually have an optical thickness of from about 0.001 to about 0.1, about 0.001 to about 0.08, about 0.001 to about 0.06, about 0.001 to about 0.04, about 0.01 to about 0.1, about 0.01 to about 0.08, about 0.01 to about 0.06, about 0.01 to about 0.04, about 0.02 to about 0.1, about 0.02 to about 0.08, about 0.02 to about 0.06, or about 0.02 to about 0.04. For example, each of the first and second outer metal or metal alloy layers 110a, 110b may individually have an optical thickness of about 0.001, about 0.01, about 0.015, about 0.016, about 0.017, about 0.02, about 0.03, about 0.04, about 0.05, about 0.06, about 0.07, about 0.08, about 0.09, about 0.1, or any optical thickness value between these values. The first and second outer metal or metal alloy layers 110a, 110b may have the same or different optical thickness.

Each of the first and second outer metal or metal alloy layers 110a, 110b may individually include at least one of nickel silicide, chromium, nickel, titanium, Monel, cobalt, platinum, indium, vanadium, stainless steel, an aluminum titanium alloy, niobium, ruthenium, a molybdenum tantalum alloy, an aluminum silicon alloy, a nickel chrome molybdenum alloy, a molybdenum rhenium alloy, molybdenum, tungsten, tantalum, rhenium, a chromium alloy, a nickel alloy, a titanium alloy, a cobalt alloy, a platinum alloy, an indium alloy, a vanadium alloy, a niobium alloy, a ruthenium alloy, a tungsten alloy, a tantalum alloy, a rhenium alloy, and combinations thereof. In one example, the first and/or second outer metal or metal alloy layers 110a, 110b may include a molybdenum rhenium alloy. In another example, the first and/or second outer metal or metal alloy layers 110a, 110b may include a chromium metal. In another example, the first and/or second outer metal or metal alloy layers 110a, 110b may include a ruthenium metal. The first and second outer metal or metal alloy layers 110a, 110b may have the same or different materials.

In some embodiments, the optical coating 100 may be characterized by an eye-weighted transmittance (Yt) of less than about 20%, less than about 10%, or less than about 5% and an eye-weighted reflectance (Yr) of less than about 30%, less than about 20%, or less than 10% as measured from both sides of the optical coating 100 with a D65 illuminant according to the CIE 10° Standard Observer. It is understood that the reflectance may be the same or different when measured from each surface.

The reflectance and transmittance values of the optical coating 100, whether eye-weighted or unweighted, are reported assuming that the optical coating 100 is disposed on a glass substrate (e.g., FIGS. 1B and 2) or between glass substrates (e.g., FIG. 1A), wherein the glass substrate(s) has an extinction coefficient k of near 0 at each wavelength of light within a working optical range of 380 nm to 760 nm (i.e., no or minimal absorption of light by the glass substrate at each wavelength within the range of 380 nm to 760 nm, at an AOI of 10 degrees). In other embodiments, it is understood that the coating could be applied to a tinted substrate that, in itself, has substantial absorption such as green or grey glass. The application of the coating is not limited to the substrate properties.

In some aspects of the present disclosure, the optical coating 100 has an eye-weighted transmittance Yt of less than or equal to about 20%, as measured with a D65 illuminant according to the CIE 10° Standard Observer from one or both sides of the optical coating 100. For example, the optical coating 100 may have an eye-weighted transmittance Yt of less than or equal to about 20%, less than or equal to about 15%, less than or equal to about 10%, less than or equal to about 5%, less than or equal to about 2.5%, or less than or equal to about 1.5%, as measured with a D65 illuminant according to the CIE 10° Standard Observer from one or both sides of the optical coating 100. For example, the optical coating 100 may have an eye-weighted transmittance Yt of from about 0.1% to about 5%, about 0.5% to about 5%, about 1% to about 5%, about 1.5% to about 5%, about 2% to about 5%, about 2.5% to about 5%, about 3% to about 5%, about 3.5% to about 5%, about 4% to about 5%, about 0.1% to about 4%, about 0.5% to about 4%, about 1% to about 4%, about 1.5% to about 4%, about 2% to about 4%, about 2.5% to about 4%, about 3% to about 4%, about 3.5% to about 4%, about 0.1% to about 3%, about 0.5% to about 3%, about 1% to about 3%, about 1.5% to about 3%, about 2% to about 3%, about 2.5% to about 3%, about 0.1% to about 2%, about 0.5% to about 2%, about 1% to about 2%, or 1.5% to about 2%, about 5% to about 10%, about 10% to about 15%, or about 15% to about 20% as measured with a D65 illuminant according to the CIE 10° Standard Observer from one or both sides of the optical coating 100.

In some aspects of the present disclosure, the optical coating 100 has an eye-weighted reflectance Yr of less than or equal to about 30%, as measured with a D65 illuminant according to the CIE 10° Standard Observer from one or both sides of the optical coating 100. For example, the optical coating 100 may have an eye-weighted reflectance Yr of less than or equal to about 30%, less than or equal to about 25%, less than or equal to about 20%, less than or equal to about 15%, less than or equal to about 10%, less than or equal to about 8%, less than or equal to about 5%, or less than or equal to about 2.5%, as measured with a D65 illuminant according to the CIE 10° Standard Observer from one or both sides of the optical coating 100. For example, the optical coating 100 may have an eye-weighted reflectance Yr of from about 0.1% to about 10%, about 1% to about 10%, about 2% to about 10%, about 2.5% to about 10%, about 3% to about 10%, about 4% to about 10%, about 5% to about 10%, about 6% to about 10%, about 7% to about 10%, about 8% to about 10%, about 0.1% to about 8%, about 1% to about 8%, about 2% to about 8%, about 2.5% to about 8%, about 3% to about 8%, about 4% to about 8%, about 5% to about 8%, about 6% to about 8%, about 0.1% to about 5%, about 1% to about 5%, about 2% to about 5%, about 2.5% to about 5%, about 3% to about 5%, about 4% to about 5%, about 10% to about 15%, about 15% to about 20%, or about 25% to about 30% as measured with a D65 illuminant according to the CIE 10° Standard Observer from one or both sides of the optical coating 100.

In some aspects, the optical coating 100 has an unweighted or absolute transmittance of less than or equal to about 30% at each wavelength of light in the range of 400 nm to 800 nm, as measured at an angle of incidence (AOI) of 0 degrees, from one or both sides of the optical coating 100. For example, the optical coating 100 may have an absolute transmittance of less than or equal to about 30%, less than or equal to about 20%, less than or equal to about 15%, less than or equal to about 10% or less than or equal to about 5% at each wavelength of light in the range of 400 nm to 800 nm, as measured at an AOI of 0 degrees, from one or both sides of the optical coating 100. In some examples, the optical coating 100 may have an absolute transmittance of less than or equal to about 30%, less than or equal to about 20%, less than or equal to about 15%, less than or equal to about 10% or less than or equal to about 5% at each wavelength of light within a particular wavelength band, as measured at an AOI of 0 degrees, from one or both sides of the optical coating 100. For example, the optical coating 100 may have an absolute transmittance of less than or equal to about 30%, less than or equal to about 20%, less than or equal to about 15%, less than or equal to about 10% or less than or equal to about 5% at each wavelength of light within the range of 400 nm to 800 nm, 500 nm to 800 nm, 600 nm to 800 nm, 700 nm to 800 nm, 400 nm to 500 nm, 400 nm to 600 nm, 400 nm to 700 nm, 500 nm to 600 nm, 500 nm to 700 nm, 600 nm to 700 nm, 450 nm to 800 nm, 450 to 550 nm, 450 nm to 600 nm, or 450 nm to 700 nm, as measured at an AOI of 0 degrees, from one or both sides of the optical coating 100.

In some aspects, the optical coating 100 has an unweighted or absolute reflectance of less than or equal to about 40% at each wavelength of light in the range of 400 nm to 800 nm, as measured at an angle of incidence (AOI) of 0 degrees from one or both sides of the optical coating 100. For example, the optical coating 100 may have an absolute reflectance of less than or equal to about 40%, less than or equal to about 30%, less than or equal to about 20%, less than or equal to about 15%, less than or equal to about 10%, or less than or equal to about 5% at each wavelength of light in the range of 400 nm to 800 nm, as measured at an AOI of 0 degrees from one or both sides of the optical coating 100. In some examples, the optical coating 100 may have an absolute reflectance of less than or equal to about 40%, less than or equal to about 30%, less than or equal to about 20%, less than or equal to about 15%, less than or equal to about 10%, or less than or equal to about 5% at each wavelength of light within a particular wavelength band from one or both sides of the optical coating 100. For example, the optical coating 100 may have an absolute reflectance of less than or equal to about 40%, less than or equal to about 30%, less than or equal to about 20%, less than or equal to about 15%, less than or equal to about 10%, or less than or equal to about 5% at each wavelength of light within the range of 400 nm to 800 nm, 500 nm to 800 nm, 600 nm to 800 nm, 700 nm to 800 nm, 400 nm to 500 nm, 400 nm to 600 nm, 400 nm to 700 nm, 500 nm to 600 nm, 500 nm to 700 nm, 600 nm to 700 nm, 450 nm to 800 nm, 450 nm to 550 nm, 450 nm to 600 nm, or 450 nm to 700 nm, as measured at an AOI of 0 degrees, from one or both sides of the optical coating 100.

In discussing color distributions (i.e., spectra of light), it is useful to refer to the Commission Internationale de l'Eclairage's (CIE) 1976 CIELAB Chromaticity Diagram (commonly referred to as the L*a*b* chart or quantification scheme). A discussion of color technology may be found in the Principles of Color Technology, 2nd Edition, by F. W. Billmeyer and M. Saltzman, J. Wiley and Sons Inc. (1981), the contents of which are incorporated herein by reference in their entirety. As used in this application, Y represents either the overall reflectance or the overall transmittance, depending on context. L*, a*, and b* may be used to characterize parameters of light in either transmission or reflection. According to the L*a*b* quantification scheme, L* represents brightness and is related to the eye-weighted value of either reflectance or transmittance (also known as normalized Y Tristimulus value) by the Y Tristimulus value of a white reference, $Y_{ref}$: $L^*=116*(Y/Y_{ref})-16$. The a*-parameter is a color coordinate that denotes the color space ranging from red (positive a*) to green (negative a*), and b* is a color coordinate that denotes the color space ranging from yellow (positive b*) and blue (negative b*). To calculate a set of color coordinates, such as L*a*b* values, from the spectral transmission or reflectance, two additional parameters are required. One is the spectral power distribution of the source or illuminant.

The present disclosure uses CIE Standard Illuminant D65 to simulate daylight. The second parameter is the spectral response of the observer, which as used herein refers to a (reflectance) value Y from the CIE 1964 10 degrees Standard Observer. The color values described herein are based on the CIE Standard D65 illuminant and a 10° Standard Observer, unless stated otherwise.

In some aspects of the present disclosure, the color of the light reflected and/or transmitted by the optical coating 100 may exhibit little to no change in color when viewed from a range of angles, i.e. may exhibit stability in the color of reflected and/or transmitted light. The modification in color of reflected and/or transmitted light may be characterized by units of ΔC*. The stability of reflected and/or transmitted light by the optical coating 100 as viewed over a range of angles may be represented by determining a change in CIE LAB color ΔC* at each angle of incidence (AOI) over a range of angles of 0 degrees to 60 degrees with respect to 0 degrees, using a D65 illuminant, wherein ΔC* is given by equation (1):

$$\Delta C^* = \sqrt{(a_j^* - a_0^*)^2 + (b_j^* - b_0^*)^2} \quad (1).$$

wherein $a_0^*$ and $b_0^*$ are the CIE LAB a* and b* values at an AOI of 0 degrees respectively, and $a_j^*$ and $b_j^*$ are the CIE LAB a* and b* values at an AOI of j degrees, wherein j=0 to 60 degrees. In some aspects, stability in the color ΔC* of the light reflected and/or transmitted by the optical coating 100 at each AOI of 0 degrees to 60 degrees is less than about 10, less than about 5, or less than about 2.5, as measured using a D65 illuminant. For example, the change in color ΔC* of the light reflected and/or transmitted by the optical coating 100 at each AOI of 0 degrees to 60 degrees may be from about 0.1 to about 10, about 1 to about 10, about 2.5 to about 10, about 5 to about 10, about 8 to about 10, about 0.1 to about 8, about 1 to about 8, about 2.5 to about 8, about 5 to about 8, about 0.1 to about 5, about 1 to about 5, about 2.5 to about 5, about 0.1 to about 2.5, 0.5 to about 2.5, or about 1 to about 2.5, as measured using a D65 illuminant.

The optical coating 100 may be configured such that light reflected and/or transmitted by the optical coating 100 is neutral in color. The color of the light reflected and/or transmitted by the optical coating 100 may be characterized using CIE LAB a* and b* color coordinates. In some aspects, the light reflected by the optical coating 100 may be neutral in color, as defined by having an a* value from about 10 to about −10 or about 5 to about −5 and a b* value of from about 10 to about −10 or about 5 to about −5, as measured using a D65 illuminant at an AOI of 0 degrees. In some aspects, the light reflected by the optical coating 100 may be neutral in color, as defined by having an a* value from about 2.5 to about −2.5 and a b* value of from about 2.5 to about −2.5, as measured using a D65 illuminant at an AOI of 0 degrees. The a* and b* values for the color of the light reflected by the optical coating 100 may be the same or different as measured on each side of the optical coating 100. In one example, the optical coating 100 may be configured such that a color of the light reflected toward an environment exterior of the substantially transparent article 10 may be different than the color of the light reflected toward an environment interior of the substantially transparent article 10. For example, when the substantially transparent article 10 is a vehicle window, it may be desirable to give the windows a darker, tinted appearance when viewed from an exterior of the vehicle, while the window may have a lighter, less tinted appearance when viewed from an interior of the vehicle. In other embodiments, the color may be quantified as C. C* may be obtained via the following equation: $C^* = \sqrt{a^{*2} + b^{*2}}$. The reflected and/or transmitted C* may be less than about 20, less than about 15, or less than about 10.

In some aspects, the light transmitted by the optical coating 100 may be neutral in color, as defined by having an a* value from about 10 to about −10 or from about 5 to about −5 and a b* value of from about 10 to about −10 or about 5 to about −5, as measured using a D65 illuminant at an AOI of 0 degrees. In some aspects, the light transmitted by the optical coating 100 may be neutral in color, as defined by having an a* value from about 2.5 to about −2.5 and a b* value of from about 2.5 to about −2.5, as measured using a D65 illuminant at an AOI of 0 degrees.

In some aspects, the light reflected and/or transmitted by the optical coating 100 is neutral in color as viewed from a range of angles of incidence from 0 degrees to 60 degrees. For example, the light reflected and/or transmitted by the optical coating 100 may have an a* value from about 10 to about −10 or about 5 to about −5 and a b* value of from about 10 to about −10 or about 5 to about −5, as measured using a D65 illuminant at each AOI from 0 to 60 degrees. In another example, the light reflected and/or transmitted by the optical coating 100 may have an a* value from about 2.5 to about −2.5 and a b* value of from about 2.5 to about −2.5, as measured using a D65 illuminant at each AOI from 0 to 60 degrees. The a* and b* values for the color of the light reflected and/or transmitted by the optical coating 100 may be the same or different as measured on each side of the optical coating 100 at each of the AOI from 0 to 60 degrees. In some aspects, the light reflected and/or transmitted by the optical coating 100 may have an a* value from about 10 to about −10 or from about 5 to about −5 and a b* value of from about 10 to about −10 or from about 5 to about −5, as measured using a D65 illuminant at each AOI from 0 degrees up to 60 degrees or even greater than 60 degrees.

In some aspects, the optical coating 100 has a total solar transmittance (TTS) of less than about 30. For example, the optical coating 100 may have a TTS of less than about 30, less than about 20, or less than about 15. In some examples, the optical coating 100 may have a TTS of from about 0.1 to about 30, about 0.1 to about 20, or about 0.1 to about 15.

The components of the optical coating 100 may be deposited using a variety of methods including physical vapor deposition ("PVD"), electron beam deposition ("e-beam" or "EB"), ion-assisted deposition-EB ("IAD-EB"), laser ablation, vacuum arc deposition, sputtering, chemical vapor deposition (CVD), plasma enhanced chemical vapor deposition (PECVD), and other similar deposition techniques.

EXAMPLES

The following examples describe various features and advantages provided by the disclosure, and are in no way intended to limit the invention and appended claims.

The data in each of the following examples was generated using a thin film modeling software program called "Essential Macleod." The program was used to calculate reflectance and transmittance as a function of wavelength using the thickness of the layers and their respective real and imaginary refractive indices (versus wavelength) as inputs. The refractive indices used in the calculations were either experimentally determined or were based on published values. Individual refractive index values are shown for the design wavelength and it should be understood that the values will change at different wavelengths. The reflectance, transmittance, and color data for each of the Examples 1-5 was determined using a D65 Illuminant and a CIE 1964 10° Standard Observer. The reference wavelength for the refractive index and extinction coefficient values for each of the Examples 1-5 is 550 nm. The medium for each of the Examples 1-5 is air. Reflectance measurements were determined from a first side of the optical coating (referred to as reflectance) and from a second side, opposite the first side (referred to as reverse reflectance). All measurements for Examples 1-5 used soda lime float glass having a refractive index of 1.52 and an extinction coefficient of 0 at 550 nm as the substrate.

Example 1

The components of an exemplary optical coating, Example 1A, according to aspects of the present disclosure is illustrated in Table 1 below. Example 1A includes the exemplary optical coating disposed between two pieces of soda lime float glass substrates.

TABLE 1

Example 1A Optical Coating Characteristics.

| Layer | Material | Refractive Index | Extinction Coefficient | Optical thickness | Physical thickness (nm) |
|---|---|---|---|---|---|
| TCO or dielectric layer | ITO | 2.02 | 0.001 | 0.22 | 58.9 |
| Outer metal or metal alloy layer | Molybdenum-rhenium alloy | 4.59 | 4.052 | 0.04 | 4.5 |
| TCO or dielectric layer | ITO | 2.02 | 0.001 | 0.17 | 46.7 |
| Inner metal or metal alloy layer | Al-Si alloy, 60:40 ratio | 3.13 | 4.485 | 0.09 | 15.4 |
| TCO or dielectric layer | ITO | 2.02 | 0.001 | 0.19 | 51.9 |
| Outer metal or metal alloy layer | Molybdenum-rhenium alloy | 4.59 | 4.052 | 0.04 | 4.3 |
| TCO or dielectric layer | ITO | 2.02 | 0.001 | 0.23 | 63.7 |

Figure 4:
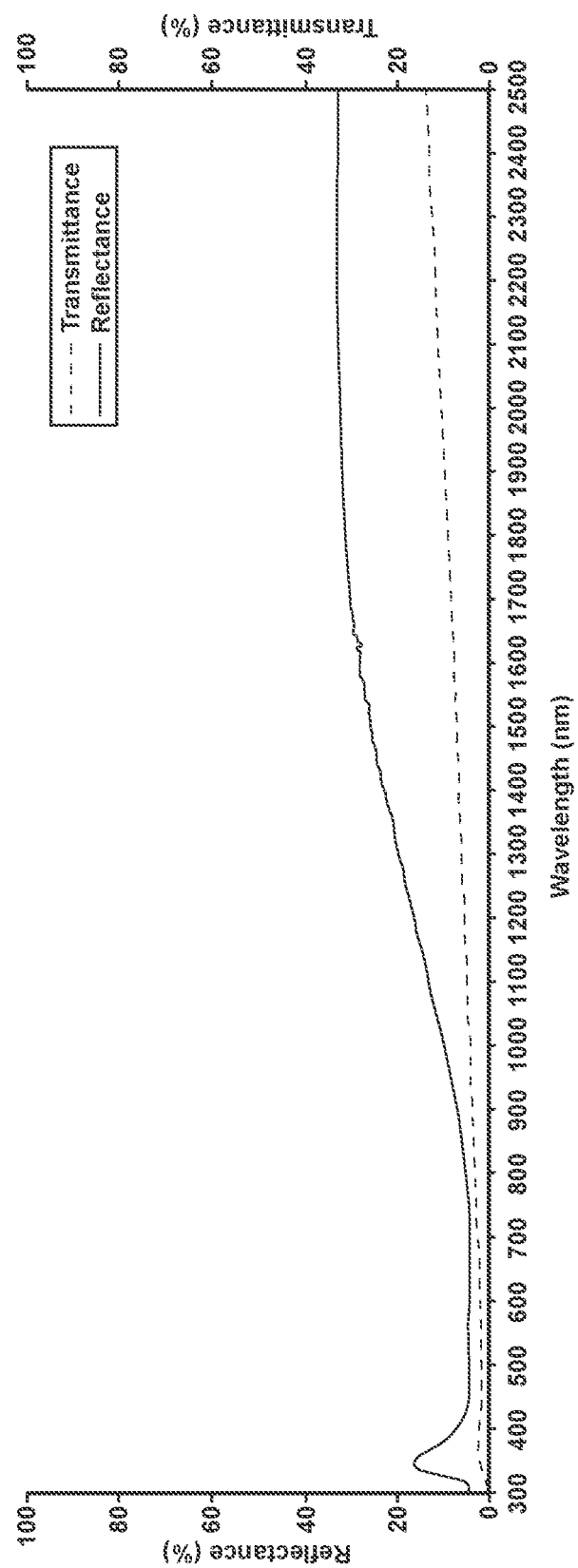
FIG. 4 is a plot of unweighted transmittance and unweighted reflectance of an optical coating disposed between a pair of glass substrates, according to an aspect of the present disclosure.

Table 2 below illustrates the average eye-weighted reflectance (Yr), transmittance (Y*), and L* a*b* color data for the optical coating of Example 1A at an AOI of 10 degrees. FIG. 4 illustrates an unweighted transmittance and unweighted reflectance spectrum for Example 1A.

TABLE 2

Eye-Weighted Optical Characteristics for Example 1A.

|  | Reflectance | Transmittance | Absorbance | Reverse Reflectance |
|---|---|---|---|---|
| Y | 4.44 | 1.79 | 93.77 | 4.23 |
| L* | 25.09 | 14.33 | — | 24.41 |

TABLE 2-continued

Eye-Weighted Optical Characteristics for Example 1A.

|  | Reflectance | Transmittance | Absorbance | Reverse Reflectance |
|---|---|---|---|---|
| a* | −0.29 | 2.13 | — | −0.08 |
| b* | −0.33 | 0.16 | — | −0.46 |

Table 2 demonstrates the low eye-weighted reflectance from both sides of the optical coating and the low eye-weighted transmittance through the coating. The data in Table 2 also demonstrates the neutral color of the reflected and transmitted light, as indicated by the low a* and b* values.

Table 3 below illustrates the eye-weighted reflectance, transmittance, and color data of the optical coating of Example 1A at a range of AOI from 0 degrees to 60 degrees. The data in Table 3 shows the stability of the color of the reflected and transmitted light at a variety of viewing angles.

TABLE 3

Angle Stability of Color of Reflected and Transmitted Light for Example 1A.

| Incident Angle | Reflectance | | | Reverse Reflectance | | | Transmittance | | |
|---|---|---|---|---|---|---|---|---|---|
| | Y | a*/b* | ΔC* | Y | a*/b* | ΔC* | Y | a*/b* | ΔC* |
| 0 | 4.4 | −0.3/−0.3 | | 4.2 | −0.1/−0.5 | | 1.8 | 2.1/0.2 | |
| 5 | 4.4 | −0.3/−0.3 | 0.0 | 4.2 | −0.1/−0.5 | 0.0 | 1.8 | 2.1/0.2 | 0.0 |
| 10 | 4.4 | −0.4/−0.3 | 0.1 | 4.2 | −0.1/−0.5 | 0.0 | 1.8 | 2.1/0.3 | 0.1 |
| 15 | 4.5 | −0.5/−0.2 | 0.2 | 4.2 | −0.1/−0.4 | 0.0 | 1.8 | 2.1/0.4 | 0.2 |
| 20 | 4.5 | −0.6/−0.1 | 0.4 | 4.3 | 0.0/−0.4 | 0.1 | 1.8 | 2.2/0.5 | 0.3 |
| 25 | 4.5 | −0.7/0 | 0.5 | 4.3 | 0.0/−0.4 | 0.1 | 1.8 | 2.2/0.7 | 0.5 |
| 30 | 4.6 | −0.8/0 | 0.6 | 4.4 | 0.1/−0.4 | 0.2 | 1.8 | 2.2/0.9 | 0.7 |
| 35 | 4.7 | −0.8/0 | 0.6 | 4.5 | 0.2/−0.4 | 0.3 | 1.8 | 2.2/1.1 | 1.0 |
| 40 | 5.0 | −0.8/−0.1 | 0.6 | 4.8 | 0.4/−0.4 | 0.5 | 1.8 | 2.2/1.4 | 1.2 |
| 45 | 5.4 | −0.8/−0.2 | 0.5 | 5.3 | 0.5/−0.4 | 0.6 | 1.8 | 2.2/1.6 | 1.5 |
| 50 | 6.2 | −0.6/−0.3 | 0.3 | 6.1 | 0.7/−0.3 | 0.8 | 1.8 | 2.2/1.9 | 1.7 |
| 55 | 7.4 | −0.4/−0.4 | 0.2 | 7.3 | 0.8/−0.2 | 0.9 | 1.8 | 2.2/2.1 | 1.9 |
| 60 | 9.3 | −0.2/−0.5 | 0.1 | 9.3 | 0.8/−0.2 | 1.0 | 1.8 | 2.1/2.3 | 2.1 |

The solar performance, as measured using total solar transmittance (TTS), of the optical coating of Example 1A, was estimated to be 0.276, assuming a glass substrate interior emissivity of 0.84. The TTS of the optical coating of Example 1A was estimated to be 0.193, assuming a glass substrate inner surface emissivity of 0.20.

Example 2

The components of an exemplary optical coating, Example 2A, according to aspects of the present disclosure is illustrated in Table 2 below. Example 2A includes the exemplary optical coating disposed on a monolithic soda lime float glass substrate. The materials used in each layer of Example 2A were the same materials as used in Example 1A.

TABLE 4

Example 2A Optical Coating Characteristics.

| Layer | Material | Refractive Index | Extinction Coefficient | Optical thickness | Physical thickness (nm) |
|---|---|---|---|---|---|
| TCO or dielectric layer | ITO | 2.02 | 0.00085 | 0.25 | 67.97 |
| Outer metal or metal alloy layer | Molybdenum-rhenium alloy | 4.58 | 4.05 | 0.035 | 4.15 |
| TCO or dielectric layer | ITO | 2.02 | 0.00085 | 0.18 | 47.99 |

TABLE 4-continued

Example 2A Optical Coating Characteristics.

| Layer | Material | Refractive Index | Extinction Coefficient | Optical thickness | Physical thickness (nm) |
|---|---|---|---|---|---|
| Inner metal or metal alloy layer | Al-Si alloy, 60:40 ratio | 3.13 | 4.48 | 0.087 | 15.32 |
| TCO or dielectric layer | ITO | 2.02 | 0.00085 | 0.19 | 51.3 |
| Outer metal or metal alloy layer | Molybdenum-rhenium alloy | 4.58 | 4.05 | 0.037 | 4.49 |
| TCO or dielectric layer | ITO | 2.024 | 0.00085 | 0.27 | 72.43 |

Figure 5:
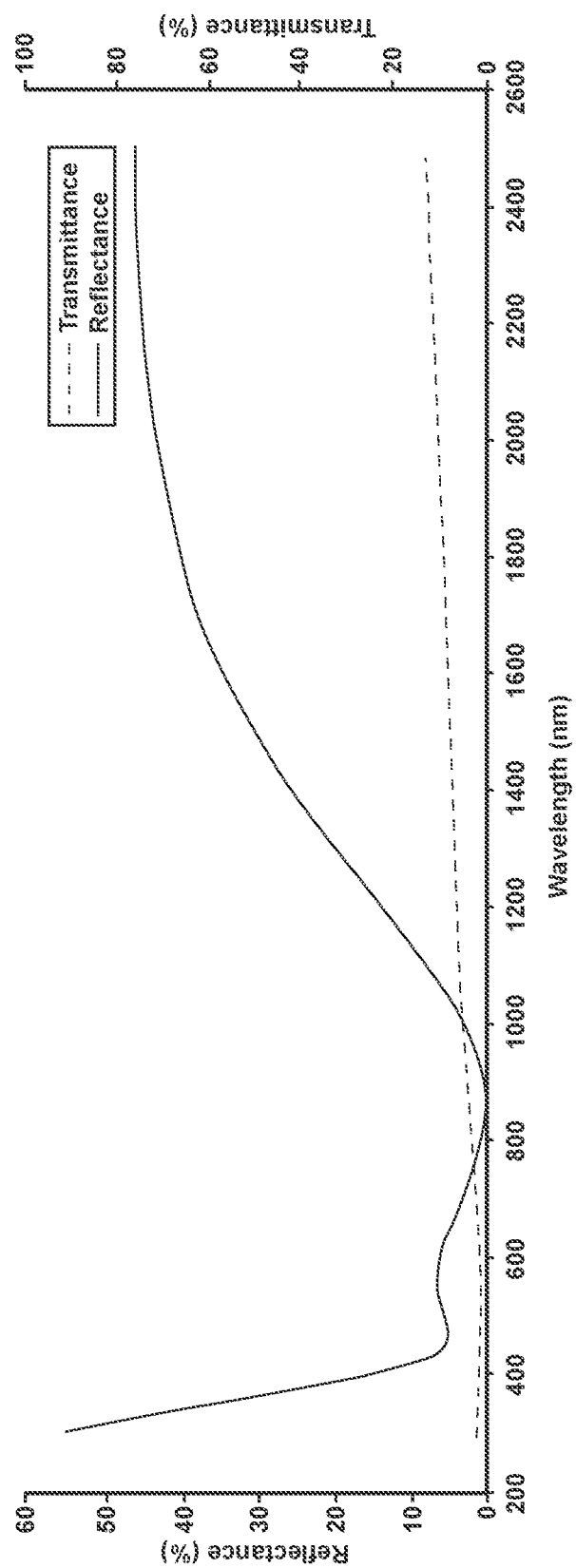
FIG. 5 is a plot of unweighted transmittance and unweighted reflectance of an optical coating disposed on a glass substrate, according to an aspect of the present disclosure.

Table 5 below illustrates the average eye-weighted reflectance (Yr), transmittance (Y*), and L* a*b* color data for the optical coating of Example 2A at an AOI of 10 degrees. FIG. 5 illustrates an unweighted transmittance and unweighted reflectance spectrum for Example 2A.

TABLE 5

Eye-Weighted Optical Characteristics for Example 2A.

| | Reflectance | Transmittance | Absorbance | Reverse Reflectance |
|---|---|---|---|---|
| Y | 6.22 | 1.82 | 91.96 | 4.75 |
| L* | 29.97 | 14.5 | — | 26.02 |
| a* | 0.34 | 2.2 | — | 0.08 |
| b* | −0.37 | 0.01 | — | 0.07 |

Table 5 demonstrates the low eye-weighted reflectance from both sides of the exemplary optical coating and the low eye-weighted transmittance through the exemplary optical coating. The data in Table 5 also demonstrates the neutral color of the reflected and transmitted light, as indicated by the low a* and b* values.

Table 6 below illustrates the eye-weighted reflectance, transmittance, and color data of the optical coating of Example 2A at a range of AOI from 0 degrees to 60 degrees. The data in Table 6 shows the stability of the color of the reflected and transmitted light at a variety of viewing angles.

TABLE 6

Angle Stability of Color of Reflected Light for Example 2A.

| Incident Angle | Reflectance | | | |
|---|---|---|---|---|
| | Y | a* | b* | ΔC* |
| 0 | 6.2 | 0.3 | −0.4 | |
| 5 | 6.2 | 0.3 | −0.3 | 0.1 |
| 10 | 6.2 | 0.0 | −0.1 | 0.4 |
| 15 | 6.2 | −0.4 | 0.1 | 0.9 |
| 20 | 6.2 | −0.9 | 0.4 | 1.5 |
| 25 | 6.3 | −1.6 | 0.6 | 2.1 |
| 30 | 6.3 | −2.2 | 0.6 | 2.8 |
| 35 | 6.5 | −2.9 | 0.5 | 3.3 |
| 40 | 6.7 | −3.4 | 0.1 | 3.7 |
| 45 | 7.2 | −3.6 | −0.5 | 4.0 |
| 50 | 7.9 | −3.5 | −1.3 | 4.0 |
| 55 | 9.2 | −3.1 | −2.2 | 3.8 |
| 60 | 11.2 | −2.3 | −2.8 | 3.6 |

Examples 1A and 2A demonstrate the ability of the optical coating to having low eye-weighted transmittance and reflectance, neutral reflected and transmitted color, and angle stability both when positioned between two glass substrates (Example 1A) and when disposed on a single glass substrate (Example 2A).

Example 3

The components of an exemplary optical coating, Example 3A, according to aspects of the present disclosure is illustrated in Table 7 below. Example 3A includes an exemplary optical coating disposed on a monolithic soda lime float glass substrate.

TABLE 7

Example 3A Optical Coating Characteristics.

| Layer | Material | Refractive Index | Extinction Coefficient | Optical thickness | Physical thickness (nm) |
|---|---|---|---|---|---|
| TCO or dielectric layer | ITO | 2.02 | 0.00085 | 0.25 | 67.99 |
| Outer metal or metal alloy layer | Molybdenum-rhenium alloy | 4.58 | 4.05 | 0.034 | 4.12 |
| TCO or dielectric layer | ITO | 2.02 | 0.00085 | 0.17 | 47.3 |
| Inner metal or metal alloy layer | Al-Si alloy, 60:40 ratio | 3.13 | 4.48 | 0.085 | 14.95 |
| TCO or dielectric layer | ITO | 2.02 | 0.00085 | 0.19 | 51.62 |
| Outer metal or metal alloy layer | Molybdenum-rhenium alloy | 4.58 | 4.05 | 0.041 | 5.01 |
| TCO or dielectric layer | ITO | 2.02 | 0.00085 | 0.24 | 66.56 |

Table 8 below illustrates the average eye-weighted reflectance (Yr), transmittance (Y*), and L* a*b* color data for the optical coating of Example 3A at an AOI of 10 degrees under 3 different conditions. Condition 1 is the as designed optical coating on the glass substrate. Condition 2 includes a 10 nm thick layer of silica disposed over the optical coating. Condition 3 includes a 100 nm thick layer of silica disposed over the optical coating. The silica is intended to simulate the presence of contamination on the optical coating, such as fingerprints or skin oil. When the optical coating is used in vehicle window or sunroof applications, it is likely that the surface of the glass substrate and/or the optical coating may become contaminated, such as by fingerprints. In some aspects, it may be preferable that the contamination does not significantly alter the reflectance, transmittance, and/or color of light reflected/transmitted by the optical coating

TABLE 8

Eye-Weighted Optical Characteristics for Example 3A.

|   | Reflectance | Transmittance | Absorbance | Reverse Reflectance |
|---|---|---|---|---|
| Condition 1 | | | | |
| Y | 3.92 | 1.8 | 94.28 | 4.81 |
| L* | 23.4 | 14.41 | — | 26.18 |
| a* | −0.1 | 2.21 | — | 0.1 |
| b* | −0.23 | −0.1 | — | 0.05 |
| Condition 2 | | | | |
| Y | 3.92 | 1.8 | 94.28 | 4.77 |
| L* | 23.41 | 14.41 | — | 26.05 |
| a* | −0.09 | 2.22 | — | −0.1 |
| b* | −0.21 | −0.1 | — | 0.14 |
| Condition 3 | | | | |
| Y | 3.91 | 1.79 | 94.3 | 5.3 |
| L* | 23.37 | 14.35 | — | 27.57 |
| a* | 0.07 | 2.26 | — | −1.09 |
| b* | −0.35 | −0.1 | — | 0.12 |

Table 8 demonstrates the low eye-weighted reflectance from both sides of the optical coating and the low eye-weighted transmittance through the coating. The data in Table 8 also demonstrates the neutral color of the reflected and transmitted light, as indicated by the low a* and b* values. Table 8 also demonstrates the stability of the transmittance, reflectance, and optical color of the optical coating in conditions that simulate the presence of fingerprints/skin oil, such as may occur when the optical coating is utilized in a vehicle window or sunroof.

Figure 6:
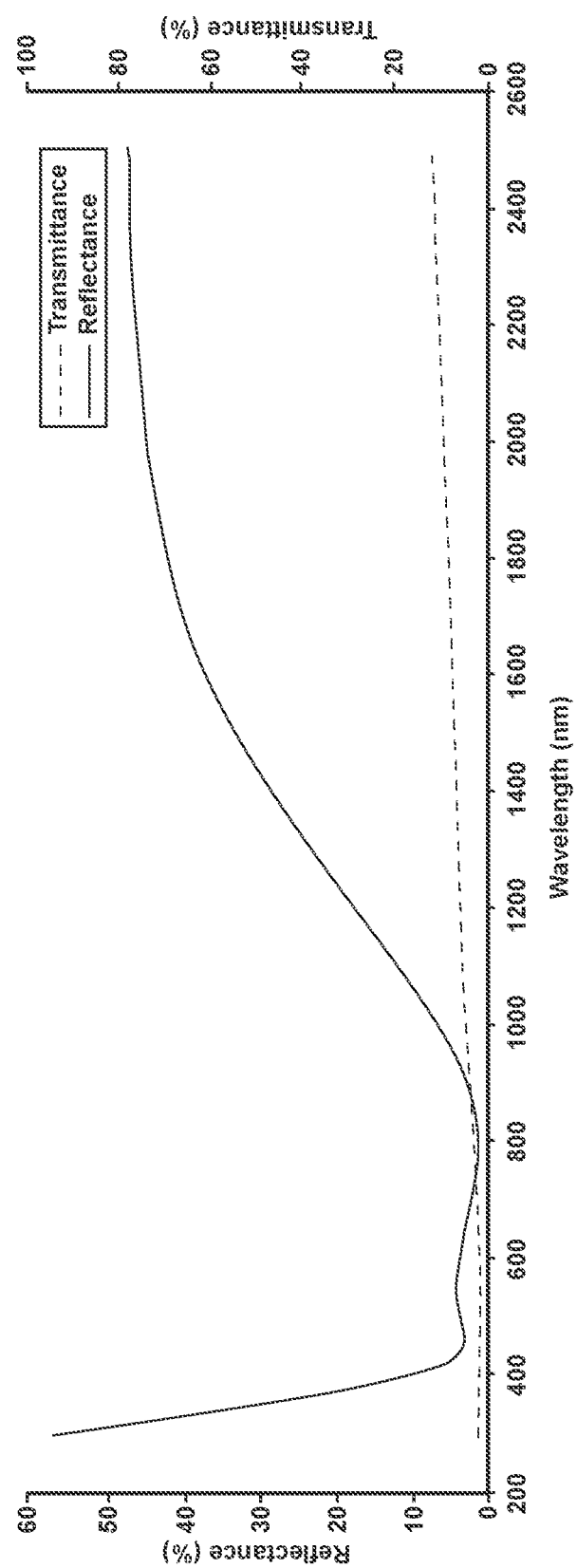
FIG. 6 is a plot of unweighted transmittance and unweighted reflectance of an optical coating disposed on a glass substrate, according to an aspect of the present disclosure.

FIG. 6 illustrates an unweighted transmittance and unweighted reflectance spectrum for Example 3A.

Table 9 below illustrates the eye-weighted reflectance, transmittance, and color data of the optical coating of Example 3A (Condition 1, without a silica simulated oil layer) at a range of AOI from 0 degrees to 60 degrees. The data in Table 9 shows the stability of the color of the reflected and transmitted light at a variety of viewing angles.

TABLE 9

Angle Stability of Color of Reflected Light for Example 3A.

| Incident Angle | Reflectance | | | |
|---|---|---|---|---|
| | Y | a* | b* | ΔC* |
| 0 | 3.9 | −0.1 | −0.2 | |
| 5 | 3.9 | −0.2 | −0.2 | 0.1 |
| 10 | 3.9 | −0.4 | 0.0 | 0.4 |
| 15 | 3.9 | −0.8 | 0.3 | 0.9 |
| 20 | 3.9 | −1.3 | 0.5 | 1.4 |
| 25 | 4.0 | −1.9 | 0.7 | 2.0 |
| 30 | 4.1 | −2.4 | 0.8 | 2.5 |
| 35 | 4.2 | −2.8 | 0.6 | 2.8 |
| 40 | 4.5 | −3.1 | 0.2 | 3.0 |
| 45 | 5.0 | −3.0 | −0.4 | 2.9 |
| 50 | 5.9 | −2.6 | −1.1 | 2.6 |
| 55 | 7.3 | −1.9 | −1.8 | 2.3 |
| 60 | 9.5 | −1.0 | −2.2 | 2.2 |

Example 4

The components of an exemplary optical coating, Example 4A, according to aspects of the present disclosure is illustrated in Table 10 below. Example 4A includes an exemplary optical coating disposed on a monolithic soda lime float glass substrate.

TABLE 10

Example 4A Optical Coating Characteristics.

| Layer | Material | Refractive Index | Extinction Coefficient | Optical thickness | Physical thickness (nm) |
|---|---|---|---|---|---|
| Outer metal or metal alloy layer | Chromium metal | 2.96 | 4.28 | 0.025 | 4.72 |
| TCO or dielectric layer | Nb$_2$O$_3$ | 2.34 | 0 | 0.20 | 47.37 |
| Inner metal or metal alloy layer | Silver-Gold alloy, 7 wt % Gold | 0.14 | 3.71 | 0.009 | 35.31 |
| TCO or dielectric layer | Nb$_2$O$_3$ | 2.34 | 0 | 0.18 | 41.48 |
| Outer metal or metal alloy layer | Chromium metal | 2.96 | 4.28 | 0.017 | 3.11 |

Figure 7:
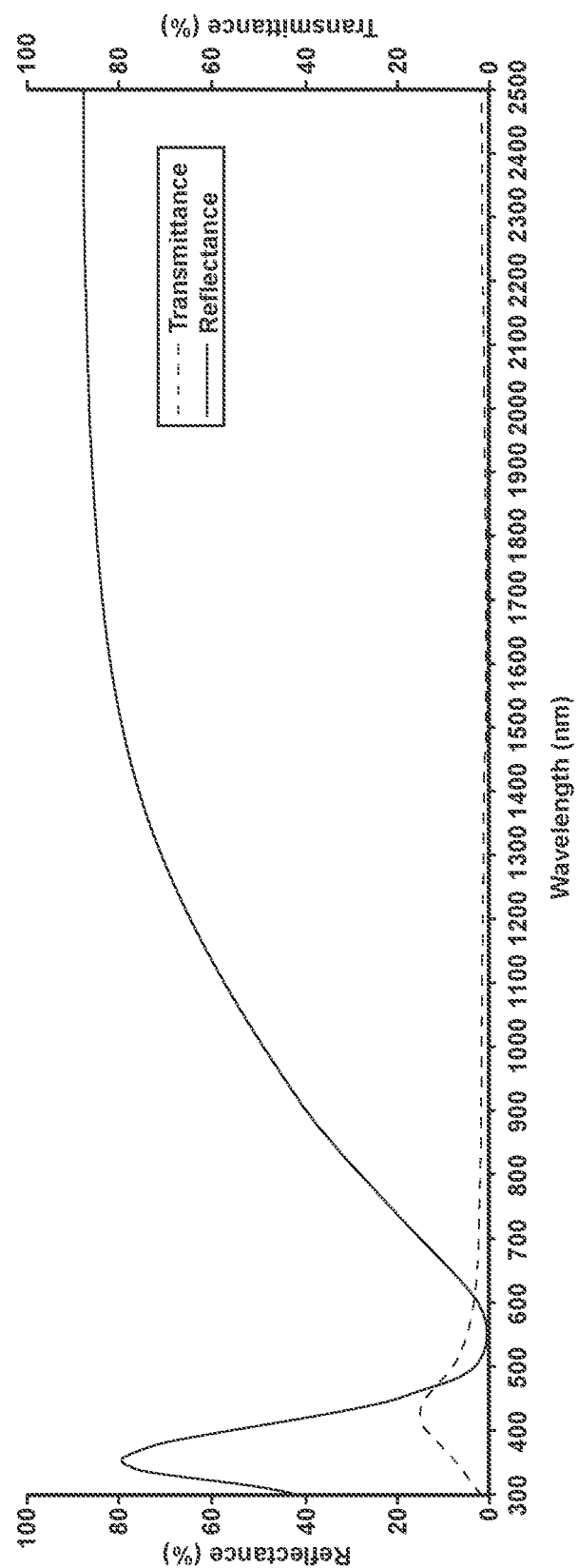
FIG. 7 is a plot of unweighted transmittance and unweighted reflectance of an optical coating disposed on a glass substrate, according to an aspect of the present disclosure.

Table 11 below illustrates the average eye-weighted reflectance (Yr), transmittance (Y*), and L* a*b* color data for the optical coating of Example 4A at an AOI of 10 degrees. FIG. 7 illustrates an unweighted transmittance and unweighted reflectance spectrum for Example 4A.

TABLE 11

Eye-Weighted Optical Characteristics for Example 4A.

|    | Reflectance | Transmittance | Absorbance | Reverse Reflectance |
|----|-------------|---------------|------------|---------------------|
| Y  | 2.53        | 4.95          | 92.52      | 5.75                |
| L* | 18.06       | 26.59         | —          | 28.77               |
| a* | 53.83       | 3.74          | —          | 26.29               |
| b* | −59.16      | −27.21        | —          | −44.53              |

Table 11 demonstrates the low eye-weighted reflectance from both sides of the optical coating and the low eye-weighted transmittance through the coating, in the absence of a second, outer pair of TCO or dielectric layers, with only an inner pair of TCO or dielectric layers adjacent the inner metal or metal alloy layer.

The solar performance, as measured using the total solar transmittance (TTS) of the optical coating of Example 4A, was estimated to be 0.142, assuming a glass substrate interior emissivity of 0.10.

Example 5

The components of an exemplary optical coating, Example 5A, according to aspects of the present disclosure is illustrated in Table 12 below. Example 5A includes an exemplary optical coating disposed on a monolithic soda lime float glass substrate having a refractive index of 1.52 and an extinction coefficient of 0 at 550 nm.

TABLE 12

Example 5A Optical Coating Characteristics.

| Layer | Material | Refractive Index | Extinction Coefficient | Optical thickness | Physical thickness (nm) |
|-------|----------|------------------|------------------------|-------------------|-------------------------|
| TCO or dielectric layer | ITO | 2.02456 | 0.00085 | 0.165036 | 44.83 |
| Outer metal or metal alloy layer | Ruthenium metal layer | 3.28791 | 5.45816 | 0.031317 | 5.24 |
| TCO or dielectric layer | $Nb_2O_3$ | 2.34039 | 0 | 0.176769 | 41.54 |
| Inner metal or metal alloy layer | Al-Si alloy, 85:15 ratio | 1.2906 | 4.67316 | 0.040345 | 17.19 |
| TCO or dielectric layer | $Nb_2O_3$ | 2.34039 | 0 | 0.225097 | 52.9 |
| Outer metal or metal alloy layer | Ruthenium metal layer | 3.28791 | 5.45816 | 0.035661 | 5.97 |
| TCO or dielectric layer | ITO | 2.02456 | 0.00085 | 0.201409 | 54.72 |

Figure 8:
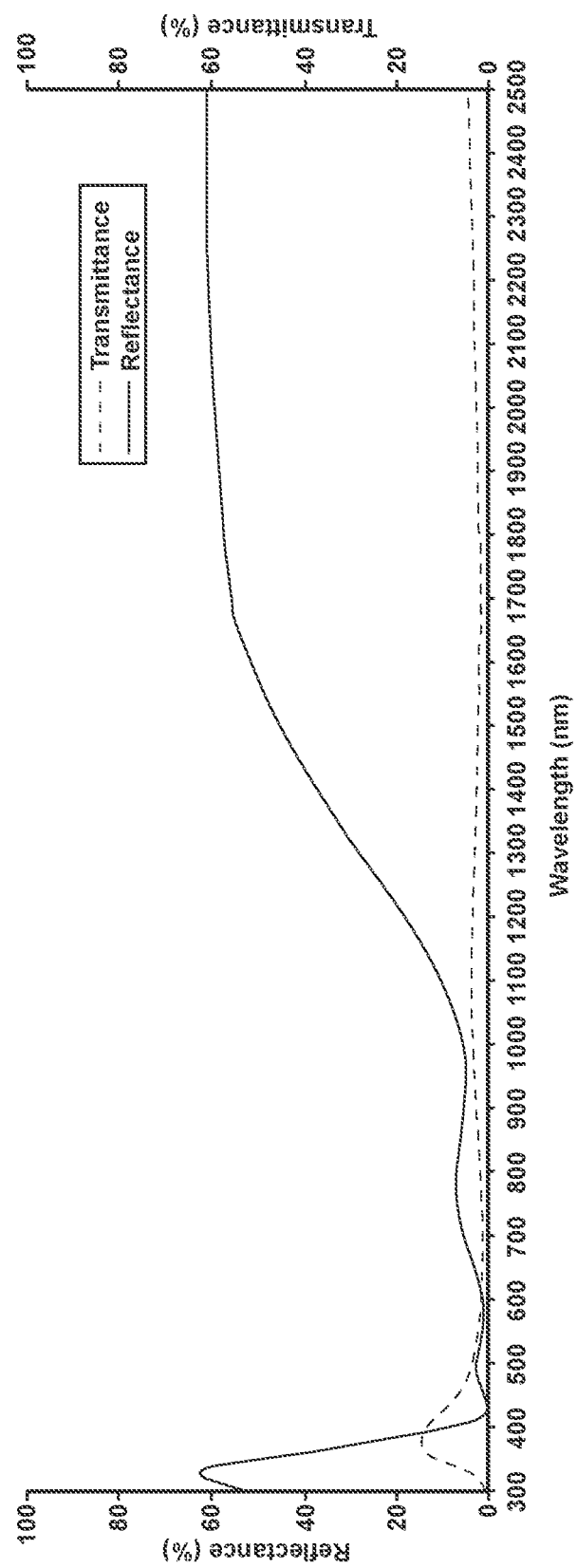
FIG. 8 is a plot of unweighted transmittance and unweighted reflectance of an optical coating disposed on a glass substrate, according to an aspect of the present disclosure.

Table 13 below illustrates the average eye-weighted reflectance (Yr), transmittance (Y*), and L* a*b* color data for the optical coating of Example 5A at an AOI of 10 degrees. FIG. 8 illustrates an unweighted transmittance and unweighted reflectance spectrum for Example 5A.

TABLE 13

Eye-Weighted Optical Characteristics for Example 5A.

|    | Reflectance | Transmittance | Absorbance | Reverse Reflectance |
|----|-------------|---------------|------------|---------------------|
| Y  | 1.61        | 2.46          | 95.93      | 6.09                |
| L* | 13.28       | 17.74         | —          | 29.65               |
| a* | −4.79       | 5.47          | —          | 6.41                |
| b* | 4.26        | −23.27        | —          | 8.23                |

Table 13 demonstrates the low eye-weighted reflectance from both sides of the optical coating and the low eye-weighted transmittance through the coating using different materials for the inner and outer pair of TCO or dielectric layers.

The solar performance, as measured using the total solar transmittance (TTS) of the optical coating of Example 5A, was estimated to be 0.166, assuming a glass substrate interior emissivity of 0.10.

The following non-limiting aspects are encompassed by the present disclosure:

According to a first aspect of the present disclosure, an optical coating for a glass substrate, includes: an inner metal or metal alloy layer including a refractive index of about 4 or less, as measured at a wavelength of 550 nm, the inner metal or metal alloy layer including a first surface and a second surface; a first pair of transparent conductive oxide or dielectric layers, wherein each of the first pair of transparent conductive oxide or dielectric layers individually includes a refractive index of about 2.5 or less, as measured at a wavelength of 550 nm, and wherein one of the first pair of transparent conductive oxide or dielectric layers is disposed over the first surface and the other of the first pair of transparent conductive oxide or dielectric layers is disposed over the second surface; and a pair of outer metal or metal alloy layers disposed over each of the first pair of transparent conductive oxide or dielectric layers, wherein each of the pair of outer metal or metal alloy layers individually includes a refractive index of at least about 2, as measured at a wavelength of 550 nm; wherein the optical coating includes an eye-weighted transmittance of less than about 5% and an eye-weighted reflectance of less than about 10%, as measured with a D65 illuminant according to the CIE 10° Standard Observer.

According to a second aspect of the present disclosure, the optical coating of the first aspect, wherein the inner metal or metal alloy layer includes at least one of a silver alloy, a silver-gold alloy, chrome, ruthenium, stainless steel, silicon, titanium, nickel, molybdenum, indium, palladium, osmium, aluminum, cobalt, cadmium, niobium, brass, bronze, tungsten, rhenium, iridium, scandium, yttrium, zirconium, vanadium, manganese, iron, zinc, tin, lead, bismuth, antimony, rhodium, tantalum, copper, nickel, gold, platinum, a chromium alloy, a ruthenium alloy, a silicon alloy, a titanium alloy, a nickel alloy, a molybdenum alloy, nickel-based alloys, an indium alloy, a palladium alloy, an osmium alloy, an aluminum alloy, a cobalt alloy, a cadmium alloy, a niobium alloy, brass, bronze, a tungsten alloy, a rhenium alloy, an iridium alloy, a scandium alloy, a yttrium alloy, a zirconium alloy, a vanadium alloy, a manganese, an iron alloy, a zinc alloy, a tin alloy, a lead alloy, a bismuth alloy, an antimony alloy, a rhodium alloy, a tantalum alloy, a copper alloy, a gold alloy, a platinum alloy, an aluminum-silicon alloy, Inconel, and combinations thereof.

According to a third aspect of the present disclosure, the optical coating of the first aspect or the second aspect, wherein the inner metal or metal alloy layer includes an extinction coefficient of at least about 3, as measured at a wavelength of 550 nm.

According to a fourth aspect of the present disclosure, the optical coating of any one of the first aspect to the third aspect, wherein the inner metal or metal alloy layer includes a physical thickness of from about 10 nm to about 100 nm.

According to a fifth aspect of the present disclosure, the optical coating of any one of the first aspect to the fourth aspect, wherein a first one of the first pair of transparent conductive oxide or dielectric layers includes a different material than a second one of the first pair of transparent conductive oxide or dielectric layers.

According to a sixth aspect of the present disclosure, the optical coating of any one of the first aspect to the fifth aspect, wherein each of the first pair of transparent conductive oxide or dielectric layers individually includes at least one of SiO2, MgO, Nb2O3, Ta2O5, ZrO2, MgF2, TiOx, CeOx, SnO2, ZnS, NiOx, CrxOy, NbxOy, and ZrOx, WO₃, NiO or TixSiOy, zinc oxide, aluminum zinc oxide, titanium oxide, silicon nitride, indium doped tin oxide, iron doped tin oxide, antimony doped tin oxide, doped zinc oxide, aluminum doped zinc oxide, gallium doped zinc oxide, boron doped zinc oxide, indium doped zinc oxide, and combinations thereof.

According to a seventh aspect of the present disclosure, the optical coating of any one of the first aspect to the sixth aspect, wherein each of the first pair of transparent conductive oxide or dielectric layers individually includes a physical thickness of from about 10 nm to about 100 nm.

According to an eighth aspect of the present disclosure, the optical coating of any one of the first aspect to the seventh aspect, wherein each of the first pair of transparent conductive oxide or dielectric layers individually includes an extinction coefficient of less than about 0.2, as measured at a wavelength of about 550 nm.

According to a ninth aspect of the present disclosure, the optical coating of any one of the first aspect to the eighth aspect, further including: a second pair of transparent conductive oxide or dielectric layers individually including a refractive index of about 3.0 or less, as measured at a wavelength of 550 nm, wherein one of the second pair of transparent conductive oxide or dielectric layers is disposed over one of the first pair of transparent conductive oxide or dielectric layers and the other of the second pair of transparent conductive oxide of dielectric layers is disposed over the other of the first pair of transparent conductive oxide or dielectric layers.

According to a tenth aspect of the present disclosure, the optical coating of the ninth aspect, wherein at least one of the second pair of transparent conductive oxide or dielectric layers includes a different material than at least one of the first pair of transparent conductive oxide or dielectric layers.

According to an eleventh aspect of the present disclosure, the optical coating of any one of the first aspect to the tenth aspect, wherein each of the pair of outer metal or metal alloy layers individually includes at least one of nickel silicide, chromium, nickel, titanium, Monel, cobalt, platinum, indium, vanadium, stainless steel, an aluminum titanium alloy, niobium, ruthenium, a molybdenum tantalum alloy, an aluminum silicon alloy, a nickel chrome molybdenum alloy, a molybdenum rhenium alloy, molybdenum, tungsten, tantalum, rhenium, a chromium alloy, a nickel alloy, a titanium alloy, a cobalt alloy, a platinum alloy, an indium alloy, a vanadium alloy, a niobium alloy, a ruthenium alloy, a tungsten alloy, a tantalum alloy, a rhenium alloy, and combinations thereof.

According to a twelfth aspect of the present disclosure, the optical coating of any one of the first aspect to the eleventh aspect, wherein each of the pair of outer metal or metal alloy layers individually includes a physical thickness of from about 1 nm to about 20 nm.

According to a thirteenth aspect of the present disclosure, the optical coating of any one of the first aspect to the twelfth aspect, wherein each of the pair of outer metal or metal alloy layers individually includes a refractive index of at least about 3, as measured at a wavelength of 550 nm.

According to a fourteenth aspect of the present disclosure, the optical coating of any one of the first aspect to the thirteenth aspect, wherein each of the pair of outer metal or metal alloy layers individually includes an extinction coefficient of at least about 3, as measured at a wavelength of 550 nm.

According to a fifteenth aspect of the present disclosure, the optical coating of any one of the first aspect to the fourteenth aspect, wherein optical coating includes a total transmitted solar of about 30 or less.

According to a sixteenth aspect of the present disclosure, the optical coating of any one of the first aspect to the fifteenth aspect, wherein light reflected by the optical coating includes a CIE LAB a* value from about 5 to about −5 and a CIE LAB b* value from about −5 to about 5, as measured with a D65 illuminant at an angle of incidence (AOI) of 0 degrees.

According to a seventeenth aspect of the present disclosure, the optical coating of any one of the first aspect to the sixteenth aspect, wherein light transmitted by the optical coating includes a CIE LAB a* value from about 5 to about −5 and a CIE LAB b* value from about −5 to about 5, as measured with a D65 illuminant at an angle of incidence (AOI) of 0 degrees.

According to an eighteenth aspect of the present disclosure, the optical coating of any one of the first aspect to the seventeenth aspect, wherein at least one of light reflected by the optical coating and light transmitted by the optical coating includes a change in CIE LAB color ΔC* of less than about 10 at each angle of incidence (AOI) from 0 to 60 degrees with respect to 0 degrees, as measured using a D65 illuminant.

According to a nineteenth aspect of the present disclosure, the optical coating of any one of the first aspect to the eighteenth aspect, wherein the substrate includes one of a monolithic glass substrate and a glass laminate.

According to a twentieth aspect of the present disclosure, the optical coating of the first aspect, wherein: the inner metal or metal alloy layer includes an aluminum-silicon alloy; the first pair of transparent conductive oxide or dielectric layers includes indium doped tin oxide; and the pair of outer metal or metal alloy layers includes a molybdenum-rhenium alloy.

According to a twenty-first aspect of the present disclosure, the optical coating of the first aspect, wherein the optical coating is characterized by an eye-weighted reflectance of less than about 10% as measured with a D65 illuminant according to the CIE 10° Standard Observer from both sides of the optical coating.

According to twenty-second aspect of the present disclosure, an optical coating for a glass substrate, includes: an inner metal or metal alloy layer including a refractive index of about 4 or less, as measured at a wavelength of 550 nm, the inner metal or metal alloy layer including a first surface and a second surface; a first pair of transparent conductive oxide or dielectric layers, wherein each of the first pair of transparent conductive oxide or dielectric layers individually includes a refractive index of about 3.0 or less, as measured at a wavelength of 550 nm, and wherein one of the first pair of transparent conductive oxide or dielectric layers is disposed over the first surface and the other of the first pair of transparent conductive oxide or dielectric layers is disposed over the second surface; and a pair of outer metal or metal alloy layers disposed over each of the first pair of transparent conductive oxide or dielectric layers, wherein each of the pair of outer metal or metal alloy layers individually includes a refractive index of at least about 2, as measured at a wavelength of 550 nm; wherein the optical coating includes an absolute transmittance of less than or equal to about 10% and an absolute reflectance of less than or equal to about 20% at each wavelength of light in the range of 400 nm to 800 nm, as measured at an angle of incidence AOI of 0 degrees.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

As used herein, the terms "index" and "refractive index" both refer to the real part of the refractive index of the material. As used herein, RI refers to refractive index and the terms "low RI", "high RI" and "medium RI" refer to RI values relative to another RI value (e.g., low RI<medium RI<high RI). According to one aspect, the term "low RI," when used with a low RI layer or sub-layer, may include an RI value of less than about 1.5, for light having a wavelength of 550 nm. The term "high RI," when used with a high RI layer or sub-layer, may include a value of at least about 1.7, as measured at a wavelength of 550 nm. The term "medium RI," when used with a medium RI layer or sub-layer, may include a value of about 1.5 to about 1.7, as measured at a wavelength of 550 nm. The ranges for low RI, high RI, and medium RI may overlap, however in each scenario, the relative relationship regarding the RI of each layer or sub-layer is based on the following relationship: low RI<medium RI<high RI. The refractive index of a material has a real component n and an imaginary component k, also referred to as the extinction coefficient. Refractive index n and extinction coefficient k values reported herein were determined for light having a wavelength of 550 nm, unless otherwise reported.

As used herein, the term "and/or," when used in a list of two or more items, means that any one of the listed items may be employed by itself, or any combination of two or more of the listed items, may be employed. For example, if a composition is described as containing components A, B, and/or C, the composition may contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "disposed" is used herein to refer to a layer or sub-layer that is coated, deposited, formed, or otherwise provided onto a surface. The term disposed may include layers/sub-layers provided in direct contact with adjacent layers/sub-layers or layers/sub-layers separated by intervening material which may or may not form a layer.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point. In some aspects of the present disclosure, the term "about" may be used to encompass a value and/or an end-point of range ±10%, ±5%, ±2.5%, or ±1%.

The reflectance, transmittance, total solar transmittance, and light color values reported herein are based on measurements generated using a thin film modeling software program called "Essential Macleod." The program was used to calculate reflectance and transmittance as a function of wavelength using the thickness of the layers and their respective real and imaginary refractive indices (versus wavelength) as inputs. The refractive indices used in the calculations were either experimentally determined or were based on published values. Individual refractive index values are shown for the design wavelength and it should be understood that the values will change at different wavelengths. Other methods for determining transmittance, reflectance, total solar transmittance, and light color values may also be used with any appropriate scaling.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications may be made on the aforementioned structures and methods without departing from the concepts of the present disclosure, and further, it is to be understood that such concepts are intended to be covered by the following claims, unless these claims, by their language, expressly state otherwise.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. An optical coating for a substantially transparent substrate, comprising:
    an inner metal or metal alloy layer comprising a refractive index of about 4 or less, as measured at a wavelength of 550 nm, the inner metal or metal alloy layer comprising a first surface and a second surface, wherein the inner metal or metal alloy layer comprises an aluminum-silicon alloy;
    a first pair of transparent conductive oxide or dielectric layers, wherein each of the first pair of transparent conductive oxide or dielectric layers individually comprises a refractive index of about 3.0 or less, as measured at a wavelength of 550 nm, and wherein one of the first pair of transparent conductive oxide or dielectric layers is disposed over the first surface and the other of the first pair of transparent conductive oxide or dielectric layers is disposed over the second surface, wherein the first pair of transparent conductive oxide or dielectric layers comprises indium doped tin oxide; and a pair of outer metal or metal alloy layers disposed over each of the first pair of transparent conductive oxide or dielectric layers, wherein each of the pair of outer metal or metal alloy layers individually comprises a refractive index of at least about 2, as measured at a wavelength of 550 nm, wherein the pair of outer metal or metal alloy layers comprises a molybdenum-rhenium alloy;

wherein the optical coating comprises an eye-weighted transmittance of less than about 20% and an eye-weighted reflectance of less than about 30%, as measured with a D65 illuminant according to the CIE 10° Standard Observer.

2. The optical coating of claim 1, wherein the inner metal or metal alloy layer comprises an extinction coefficient of at least about 3, as measured at a wavelength of 550 nm.

3. The optical coating of claim 1, wherein a first one of the first pair of transparent conductive oxide or dielectric layers comprises a different material than a second one of the first pair of transparent conductive oxide or dielectric layers.

4. The optical coating of claim 1, wherein each of the first pair of transparent conductive oxide or dielectric layers individually comprises a physical thickness of from about 10 nm to about 100 nm.

5. The optical coating of claim 1, wherein each of the first pair of transparent conductive oxide or dielectric layers individually comprises an extinction coefficient of less than about 0.2, as measured at a wavelength of about 550 nm.

6. The optical coating of claim 1, further comprising: a first additional transparent conductive oxide or dielectric layer comprising a refractive index of about 3.0 or less, as measured at a wavelength of 550 nm, disposed over one of the first pair of transparent conductive oxide or dielectric layers.

7. The optical coating of claim 1, further comprising: a second additional transparent conductive oxide or dielectric layer comprising a refractive index of about 3.0 or less, as measured at a wavelength of 550 nm, disposed over the other of the first pair of transparent conductive oxide or dielectric layers respective the first additional transparent conductive oxide or dielectric layer.

8. The optical coating of claim 7, wherein at least one of the first and second additional transparent conductive oxide or dielectric layers comprises a different material than at least one of the first pair of transparent conductive oxide or dielectric layers.

9. The optical coating of claim 1, wherein each of the pair of outer metal or metal alloy layers individually comprises a refractive index of at least about 3, as measured at a wavelength of 550 nm.

10. The optical coating of claim 1, wherein each of the pair of outer metal or metal alloy layers individually comprises an extinction coefficient of at least about 3, as measured at a wavelength of 550 nm.

11. The optical coating of claim 1, wherein optical coating comprises a total transmitted solar of about 30 or less.

12. The optical coating of claim 1, wherein the optical coating comprises an eye-weighted transmittance of less than about 5% and an eye-weighted reflectance of less than about 10%, as measured with a D65 illuminant according to the CIE 10° Standard Observer.

13. The optical coating of claim 1, wherein light reflected by the optical coating comprises a CIE LAB a* value from about 10 to about −10 and a CIE LAB b* value from about −10 to about 10, as measured with a D65 illuminant at an angle of incidence (AOI) of 0 degrees.

14. The optical coating of claim 1, wherein light reflected by the optical coating comprises a CIE LAB a* value from about 5 to about −5 and a CIE LAB b* value from about −5 to about 5, as measured with a D65 illuminant at an angle of incidence (AOI) of 0 degrees.

15. The optical coating of claim 1, wherein light transmitted by the optical coating comprises a CIE LAB a* value from about 10 to about −10 and a CIE LAB b* value from about −10 to about 10, as measured with a D65 illuminant at an angle of incidence (AOI) of 0 degrees.

16. The optical coating of claim 1, wherein light transmitted by the optical coating comprises a CIE LAB a* value from about 5 to about −5 and a CIE LAB b* value from about −5 to about 5, as measured with a D65 illuminant at an angle of incidence (AOI) of 0 degrees.

17. The optical coating of claim 1, wherein at least one of light reflected by the optical coating and light transmitted by the optical coating comprises a change in CIE LAB color ΔC* of less than about 20 at each angle of incidence (AOI) from 0 to 60 degrees with respect to 0 degrees, as measured using a D65 illuminant.

18. The optical coating of claim 1, wherein at least one of light reflected by the optical coating and light transmitted by the optical coating comprises a change in CIE LAB color ΔC* of less than about 10 at each angle of incidence (AOI) from 0 to 60 degrees with respect to 0 degrees, as measured using a D65 illuminant.

19. The optical coating of claim 1, wherein the optical coating is characterized by an eye-weighted reflectance of less than about 10% as measured with a D65 illuminant according to the CIE 10° Standard Observer from both sides of the optical coating.

\* \* \* \* \*